Dec. 14, 1954   R. GOURDON   2,696,919
MEANS FOR THE SORTING AND CLASSIFICATION
OF DOCUMENTS OR ARTICLES
Filed March 30, 1948   25 Sheets-Sheet 1

INVENTOR
Robert Gourdon
By Corey & Jacobs
ATTORNEYS

Dec. 14, 1954  R. GOURDON  2,696,919
MEANS FOR THE SORTING AND CLASSIFICATION
OF DOCUMENTS OR ARTICLES
Filed March 30, 1948  25 Sheets-Sheet 2
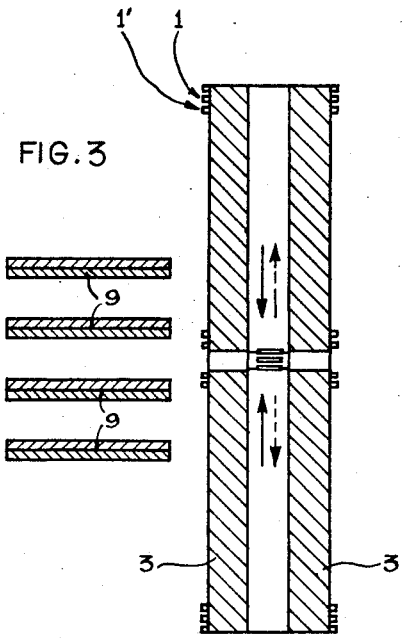
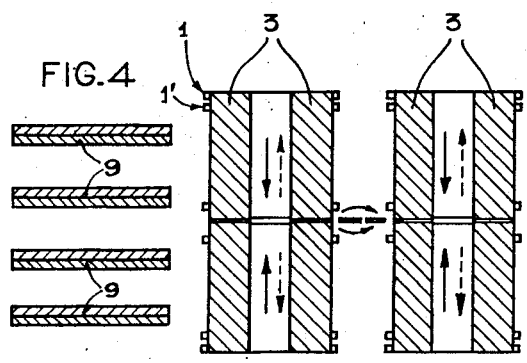
INVENTOR
Robert Gourdon
By Corey & Jacobs
ATTORNEYS

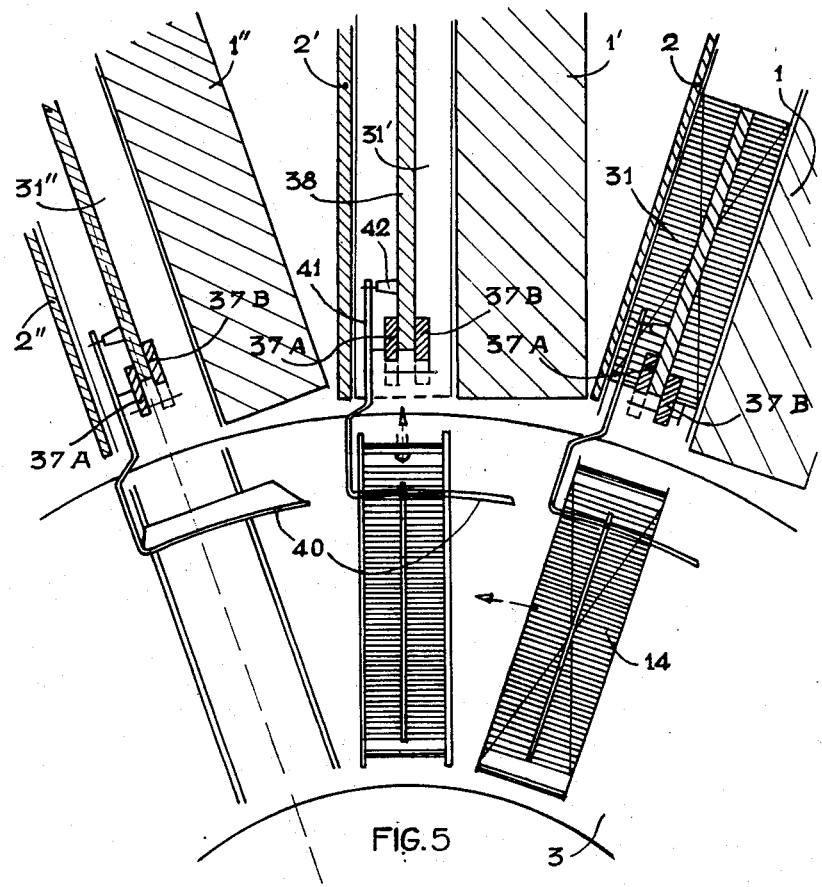
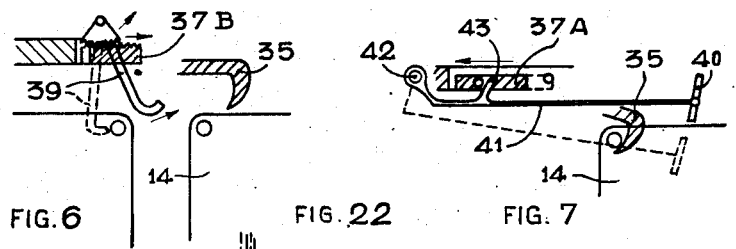
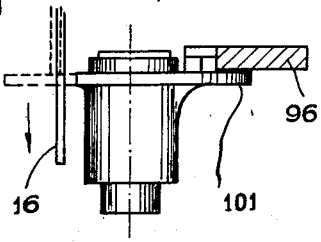

Dec. 14, 1954  R. GOURDON  2,696,919
MEANS FOR THE SORTING AND CLASSIFICATION
OF DOCUMENTS OR ARTICLES
Filed March 30, 1948  25 Sheets-Sheet 4
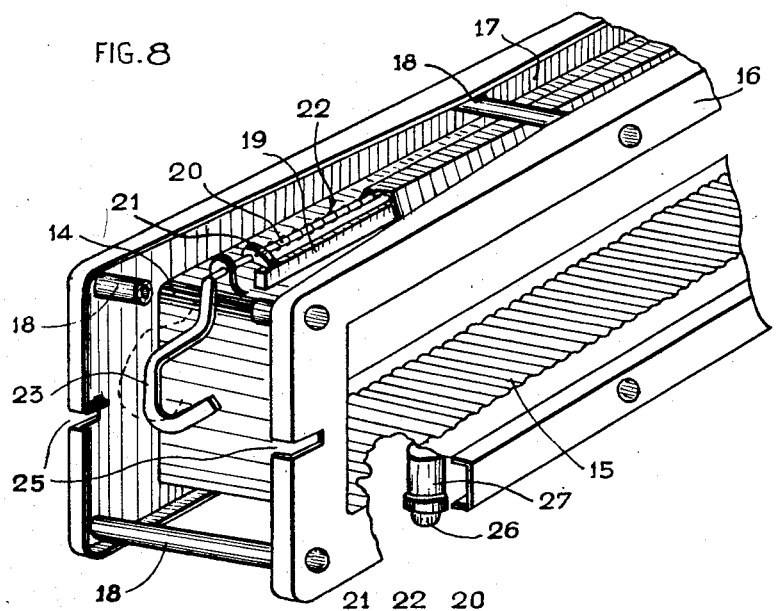
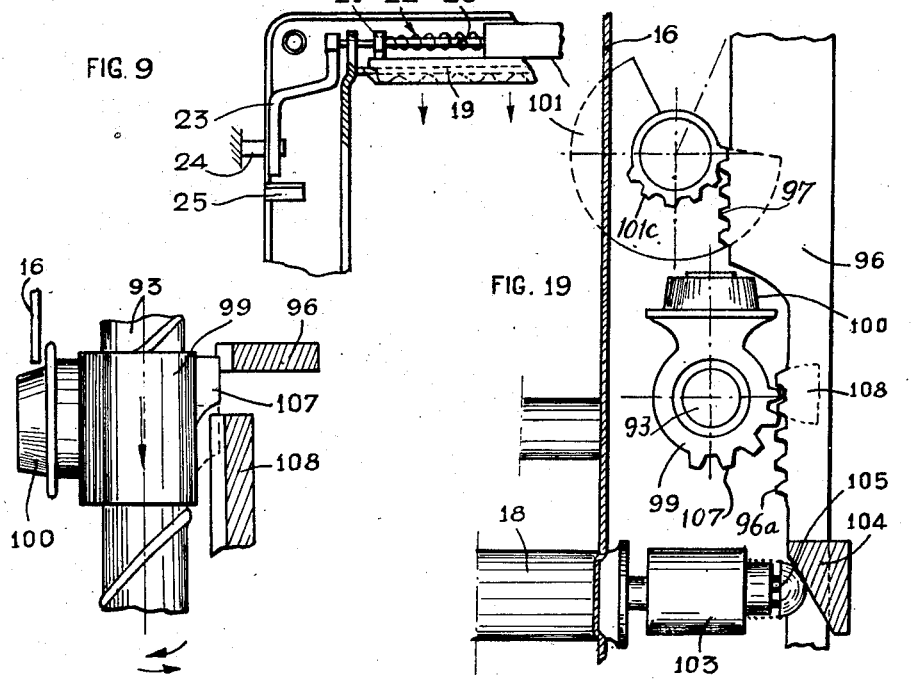
INVENTOR
Robert Gourdon
By Corey & Jacobs
ATTORNEYS

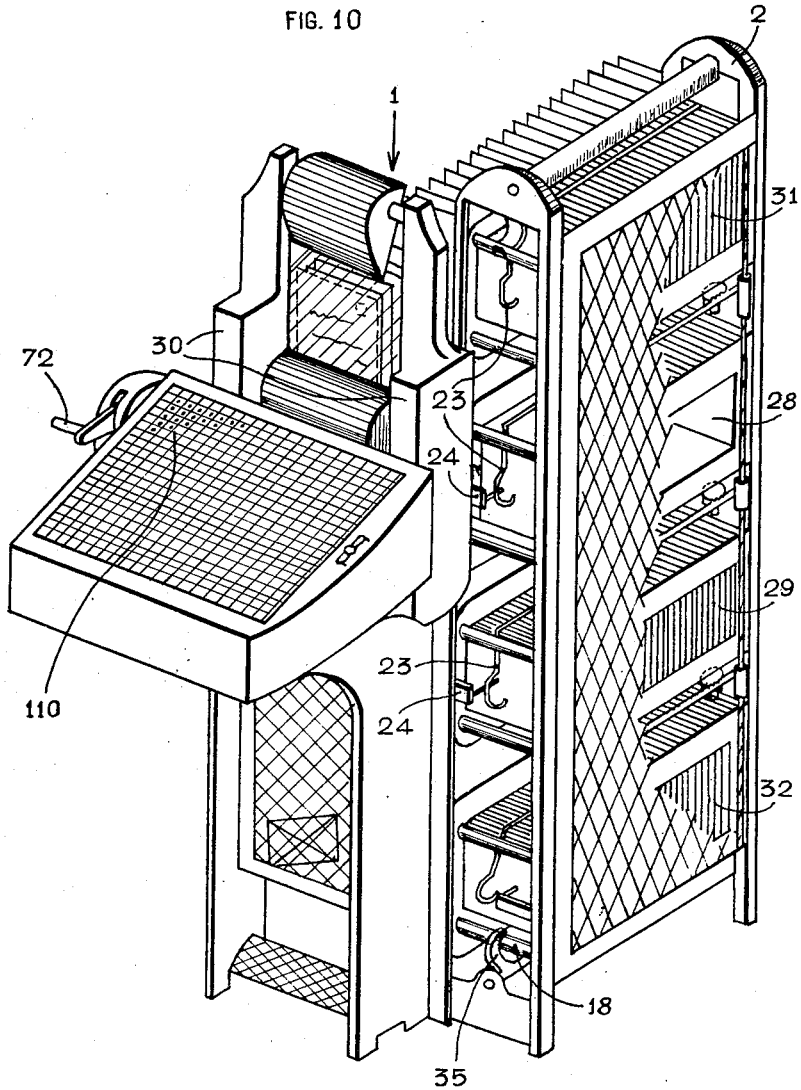

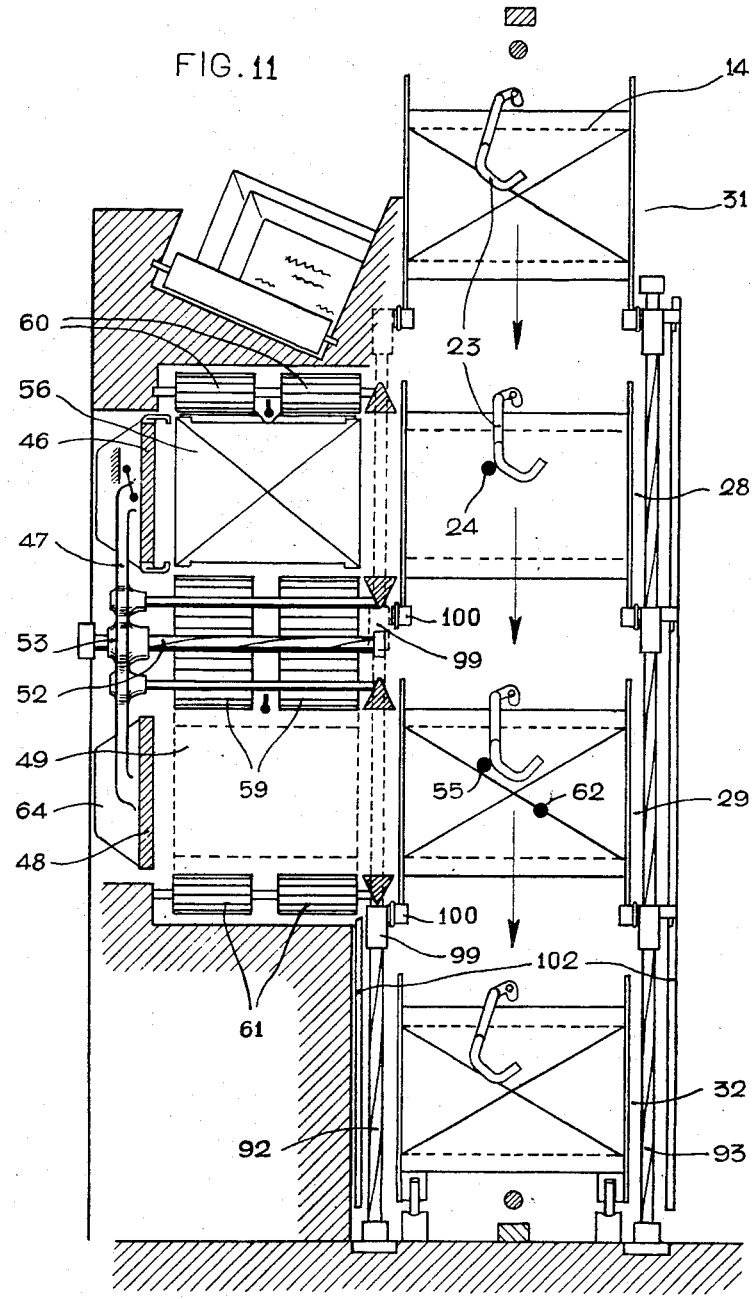

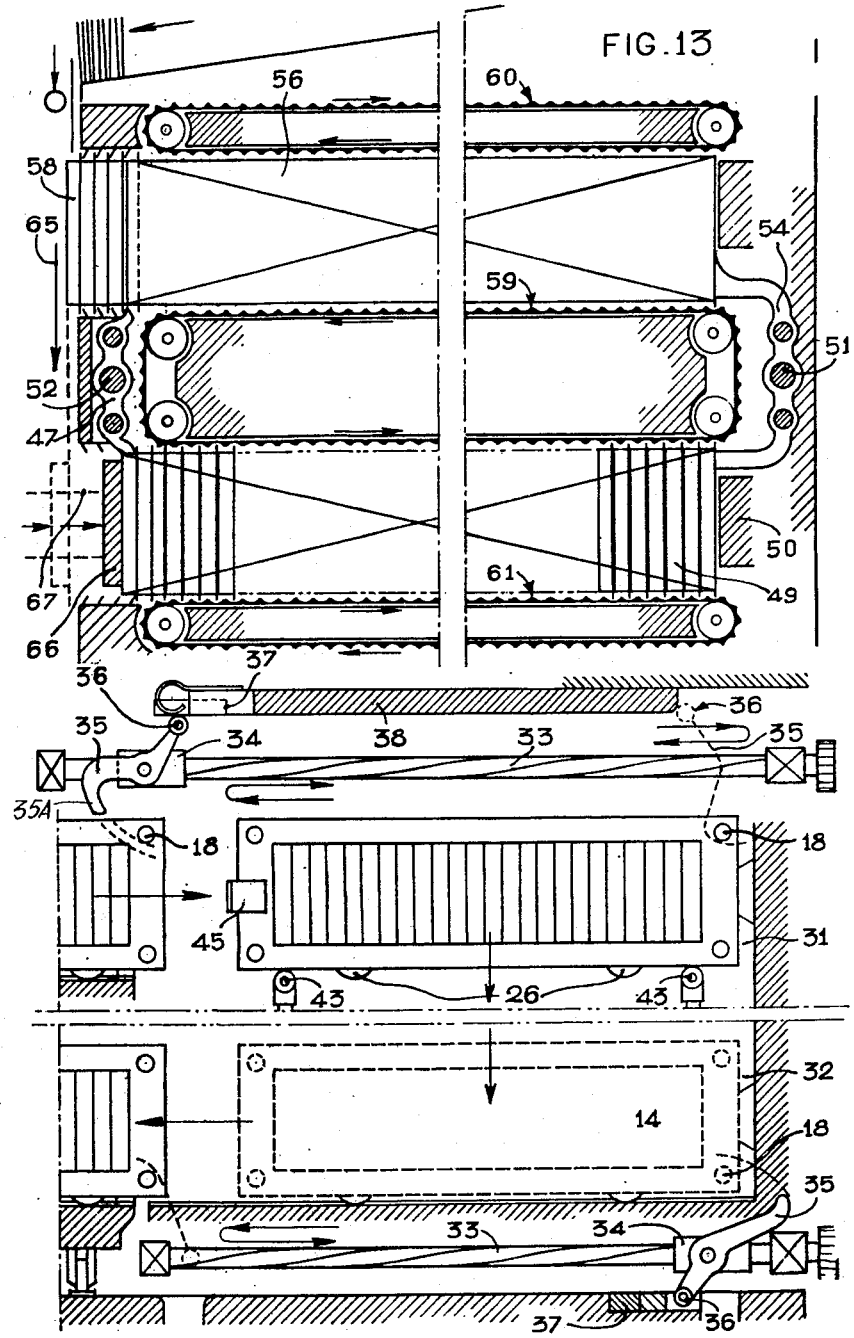

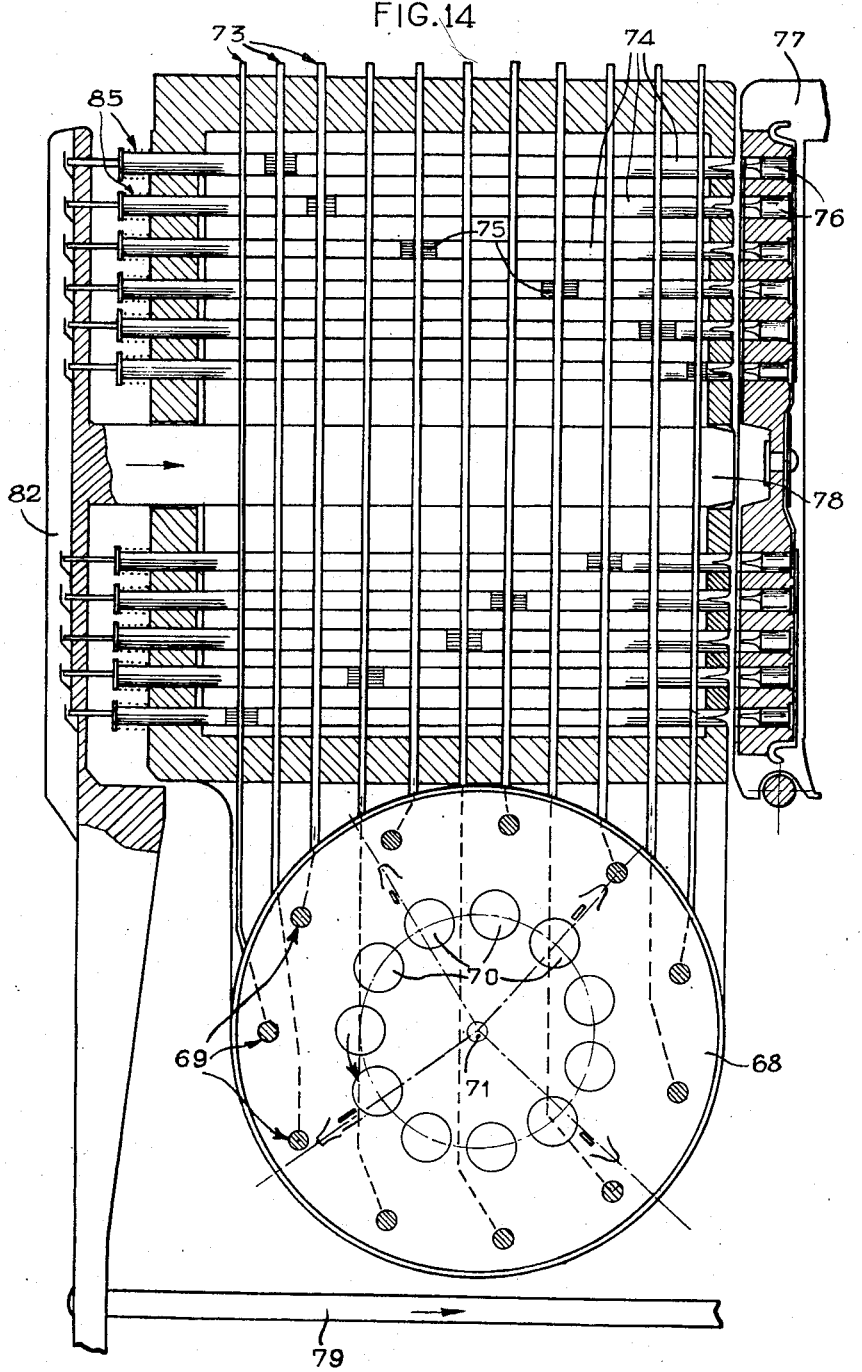

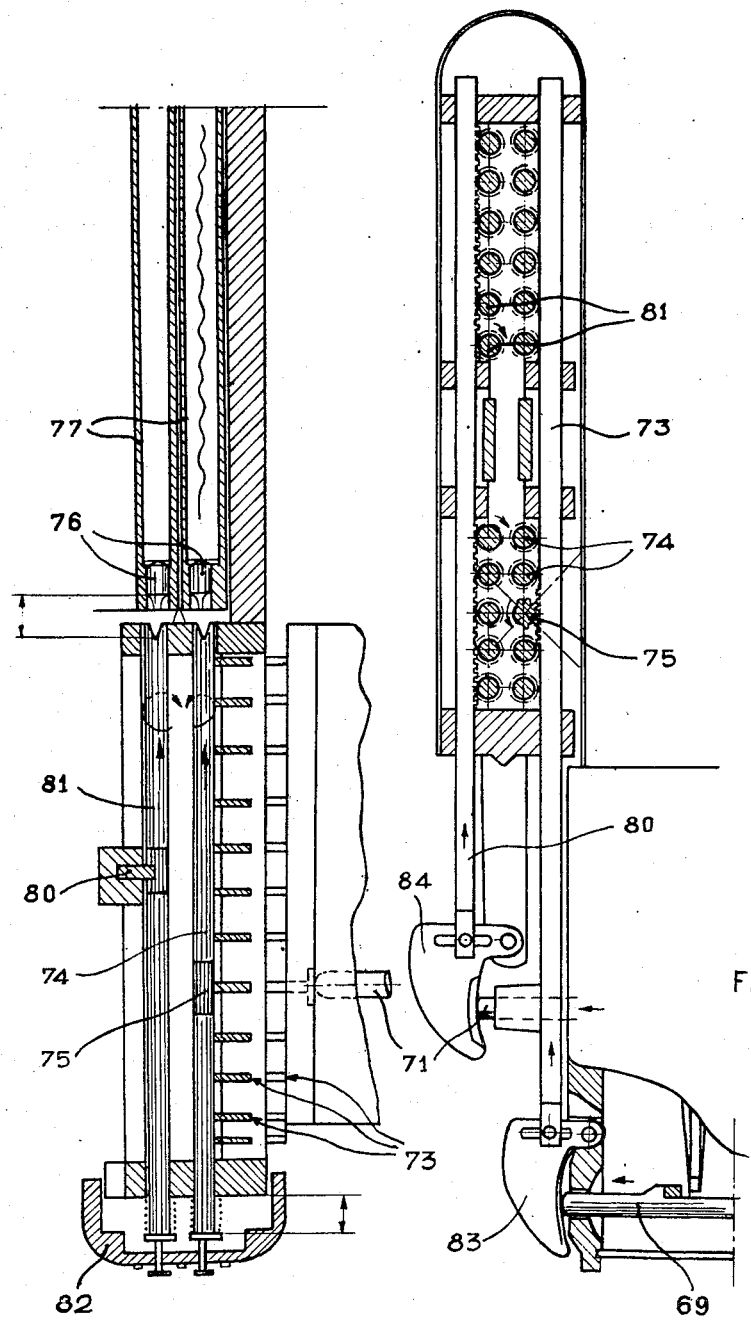

Dec. 14, 1954  R. GOURDON  2,696,919
MEANS FOR THE SORTING AND CLASSIFICATION
OF DOCUMENTS OR ARTICLES
Filed March 30, 1948 25 Sheets-Sheet 10

INVENTOR
Robert Gourdon
By Corey & Jacobs
ATTORNEYS.

Dec. 14, 1954 R. GOURDON 2,696,919
MEANS FOR THE SORTING AND CLASSIFICATION
OF DOCUMENTS OR ARTICLES
Filed March 30, 1948 25 Sheets-Sheet 11
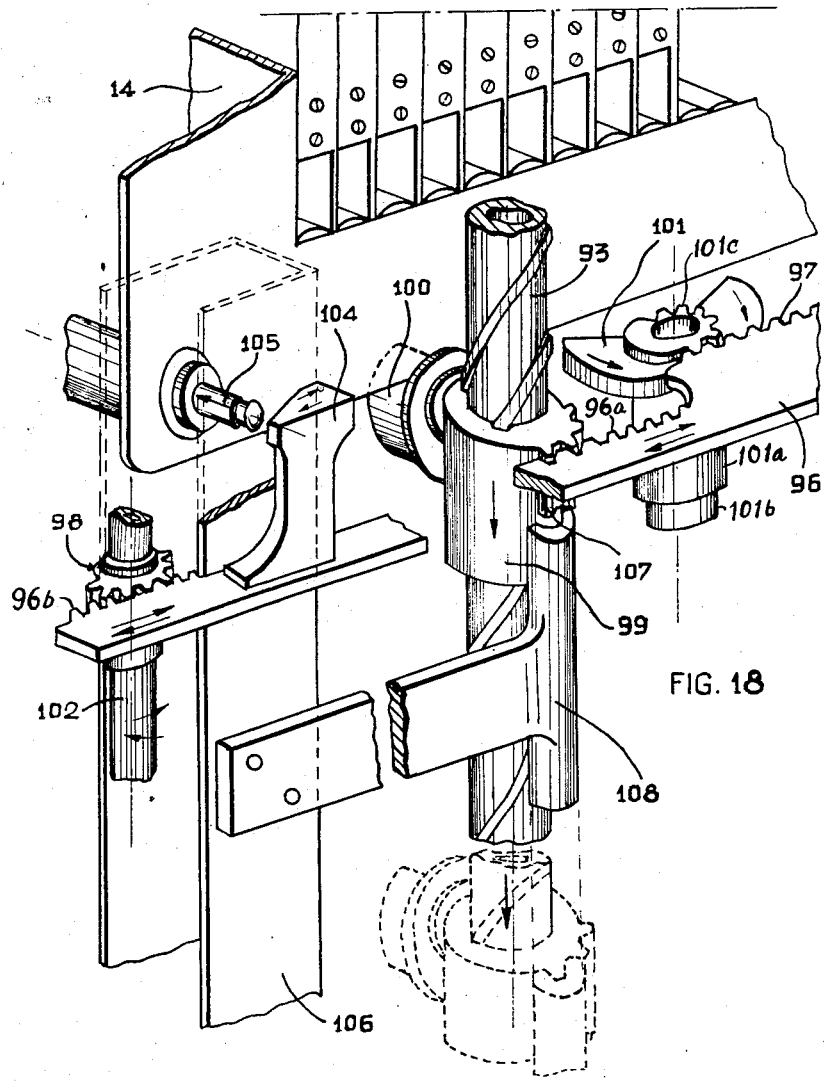
FIG. 18
FIG. 21
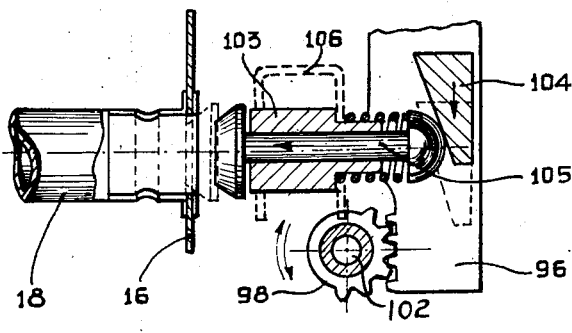
INVENTOR
Robert Gourdon
By Corey & Jacobs
ATTORNEYS.

Dec. 14, 1954  R. GOURDON  2,696,919
MEANS FOR THE SORTING AND CLASSIFICATION
OF DOCUMENTS OR ARTICLES
Filed March 30, 1948  25 Sheets-Sheet 12

INVENTOR
Robert Gourdon
By Corey & Jacobs
ATTORNEYS.

Dec. 14, 1954  R. GOURDON  2,696,919
MEANS FOR THE SORTING AND CLASSIFICATION
OF DOCUMENTS OR ARTICLES
Filed March 30, 1948  25 Sheets-Sheet 13
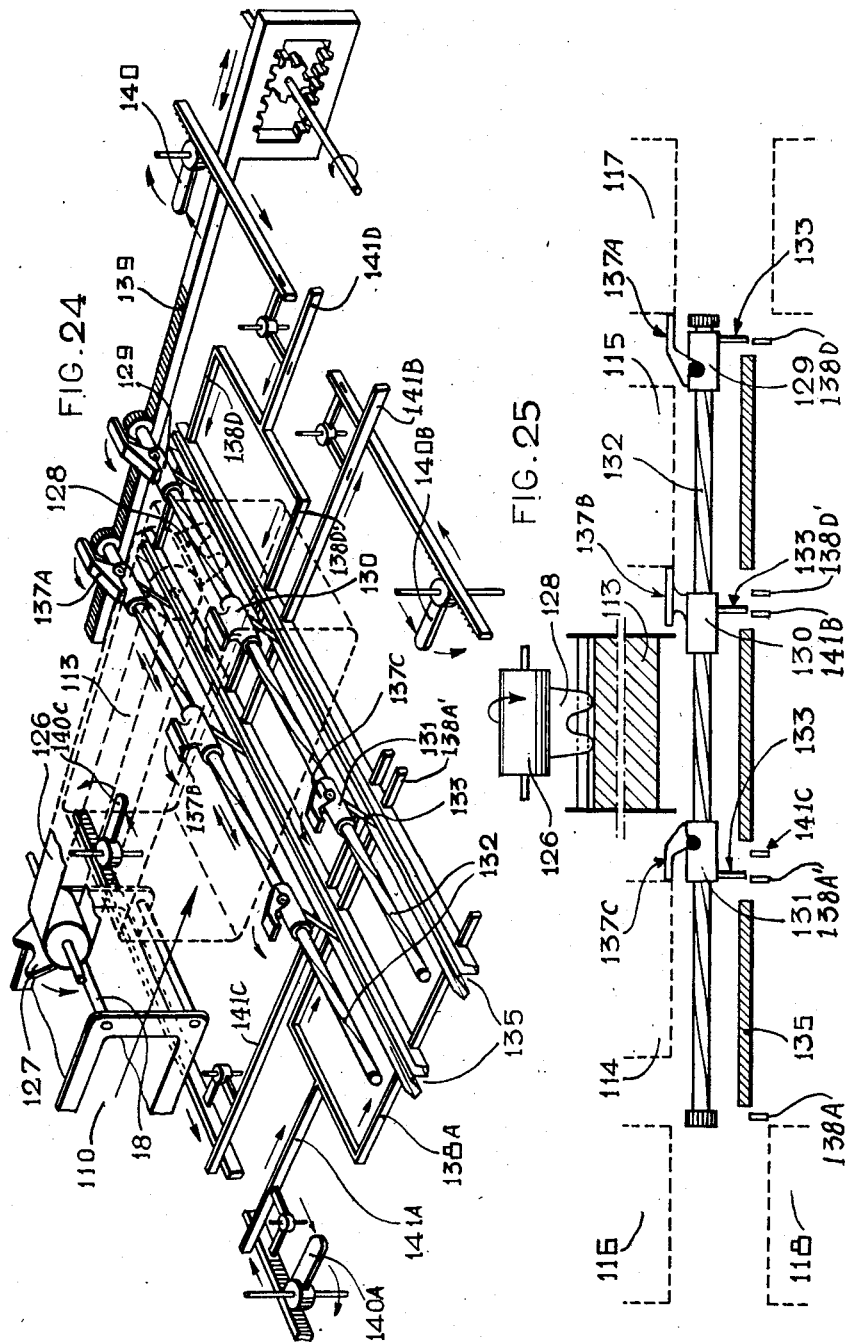
INVENTOR
Robert Gourdon
By Corey + Jacobs
ATTORNEYS.

Dec. 14, 1954   R. GOURDON   2,696,919
MEANS FOR THE SORTING AND CLASSIFICATION
OF DOCUMENTS OR ARTICLES
Filed March 30, 1948   25 Sheets-Sheet 14

INVENTOR
Robert Gourdon
By Corey + Jacobs
ATTORNEYS.

Dec. 14, 1954 R. GOURDON 2,696,919
MEANS FOR THE SORTING AND CLASSIFICATION
OF DOCUMENTS OR ARTICLES
Filed March 30, 1948 25 Sheets-Sheet 15
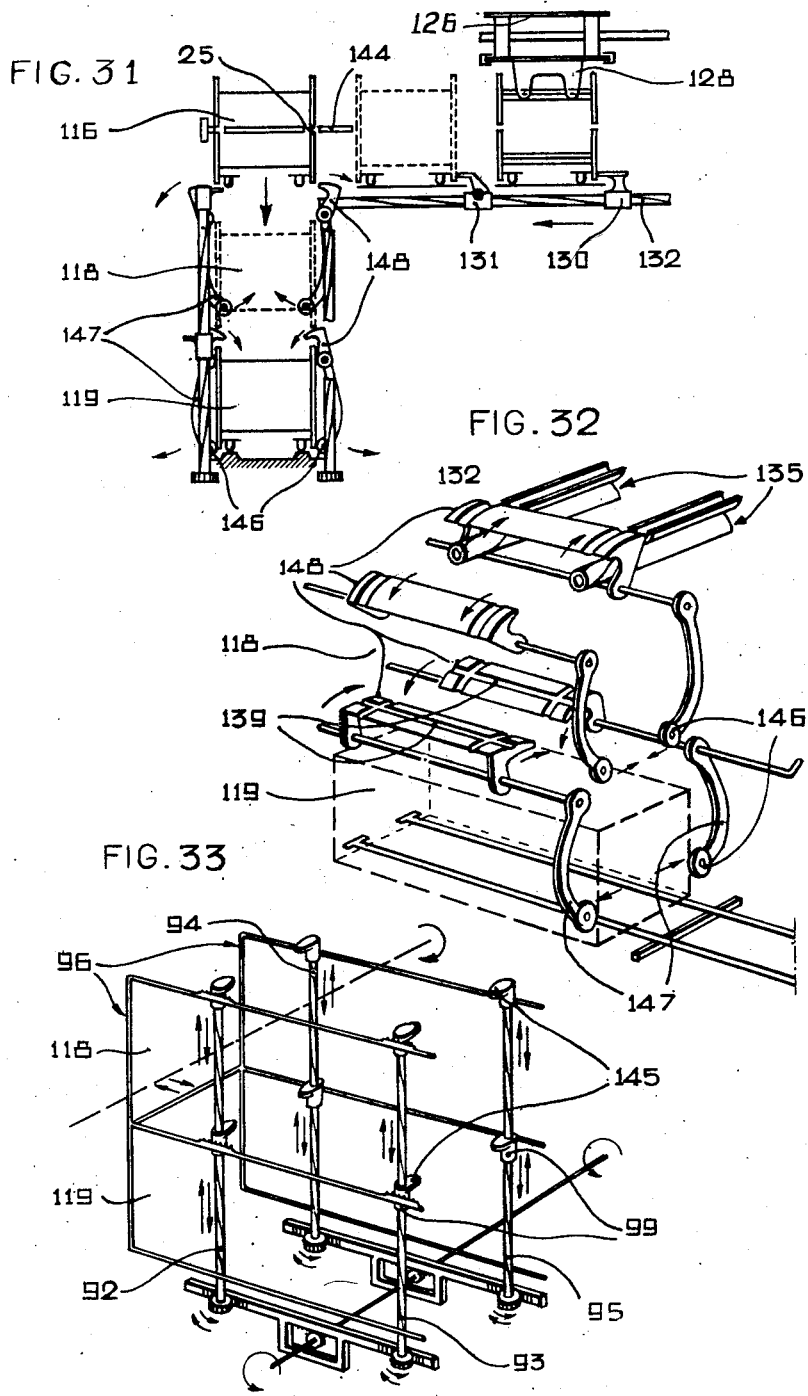
INVENTOR
Robert Gourdon
By Corey + Jacobs
ATTORNEYS.

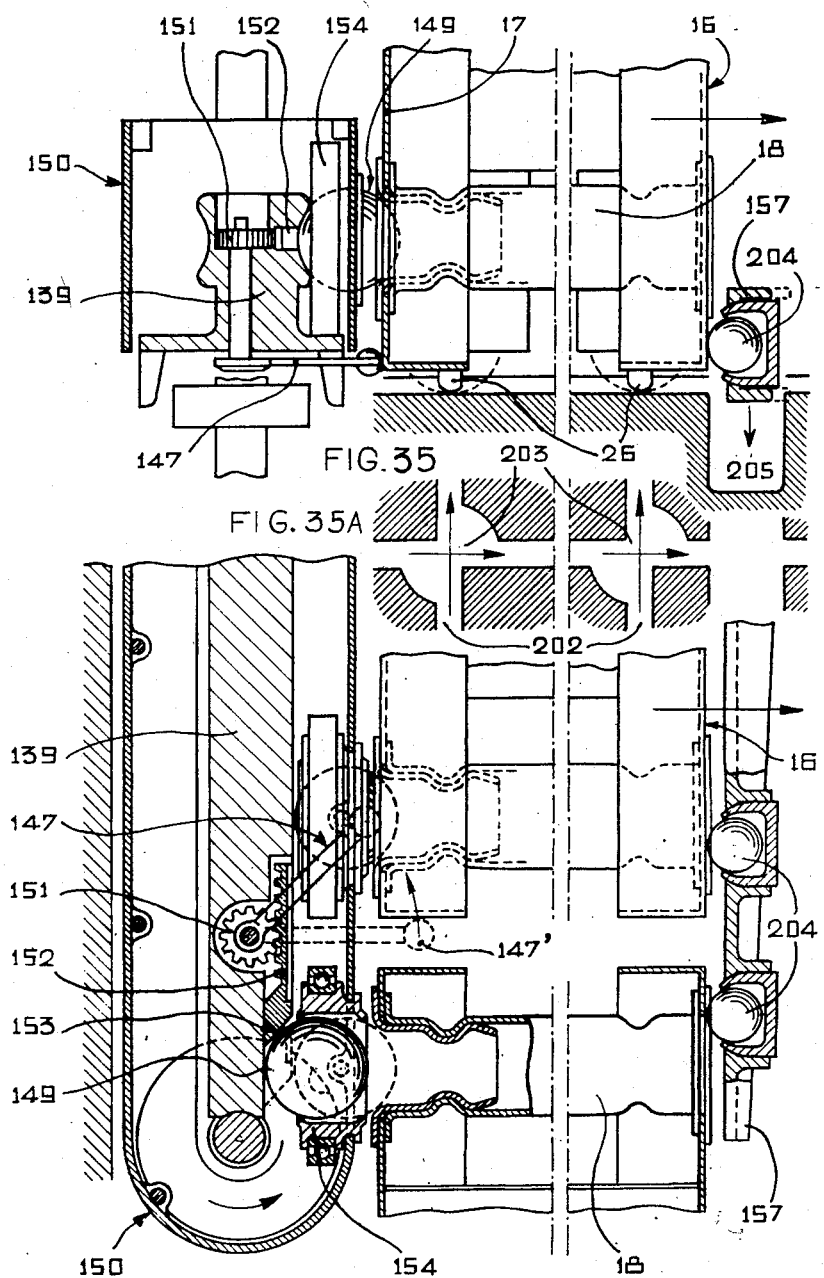

Dec. 14, 1954 R. GOURDON 2,696,919
MEANS FOR THE SORTING AND CLASSIFICATION
OF DOCUMENTS OR ARTICLES
Filed March 30, 1948 25 Sheets-Sheet 17

INVENTOR
Robert Gourdon
By Corey & Jacobs
ATTORNEYS

Dec. 14, 1954  R. GOURDON  2,696,919
MEANS FOR THE SORTING AND CLASSIFICATION
OF DOCUMENTS OR ARTICLES
Filed March 30, 1948  25 Sheets-Sheet 18
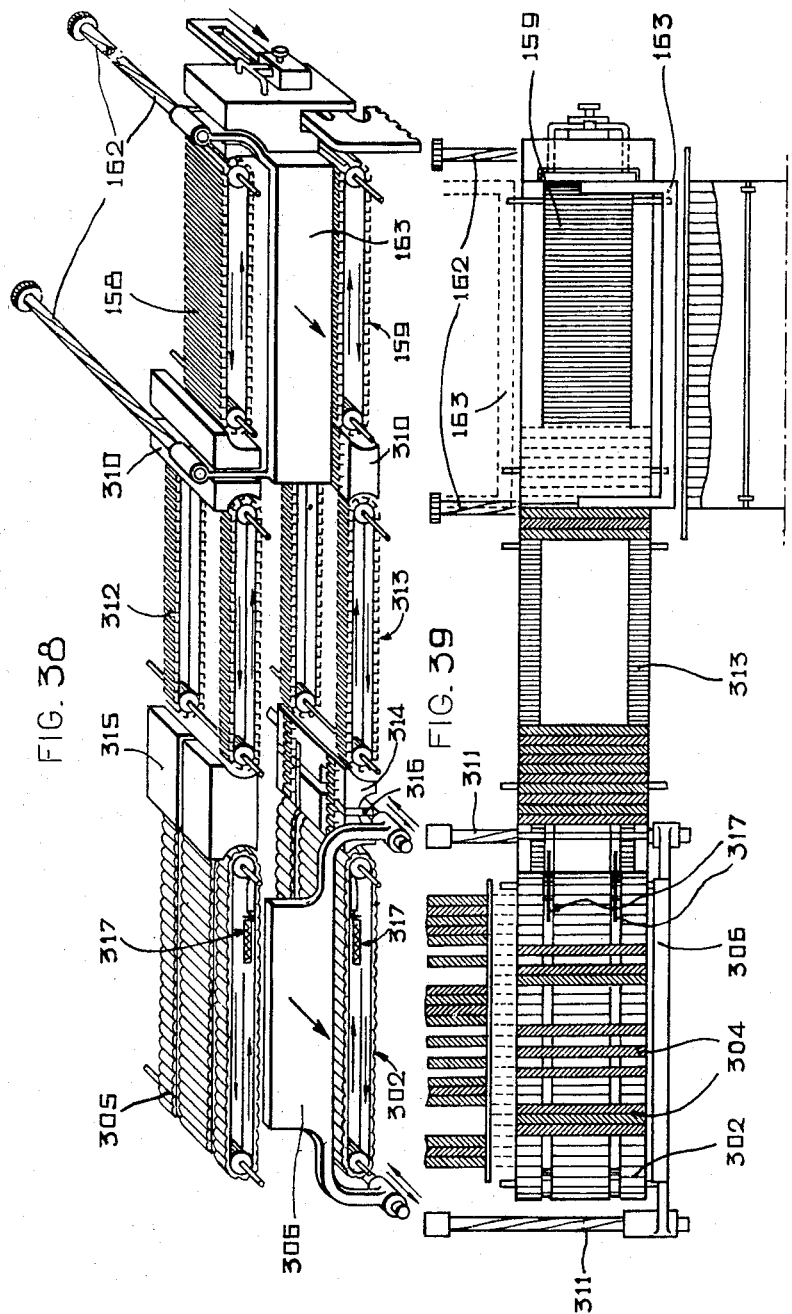
INVENTOR
ROBERT GOURDON Dec. 14, 1954    R. GOURDON    2,696,919
MEANS FOR THE SORTING AND CLASSIFICATION
OF DOCUMENTS OR ARTICLES
Filed March 30, 1948    25 Sheets-Sheet 19

INVENTOR
Robert Gourdon
By Corey & Jacobs
ATTORNEYS.

Dec. 14, 1954 R. GOURDON 2,696,919
MEANS FOR THE SORTING AND CLASSIFICATION
OF DOCUMENTS OR ARTICLES
Filed March 30, 1948 25 Sheets-Sheet 20

INVENTOR
Robert Gourdon
By Corey & Jacobs
ATTORNEYS.

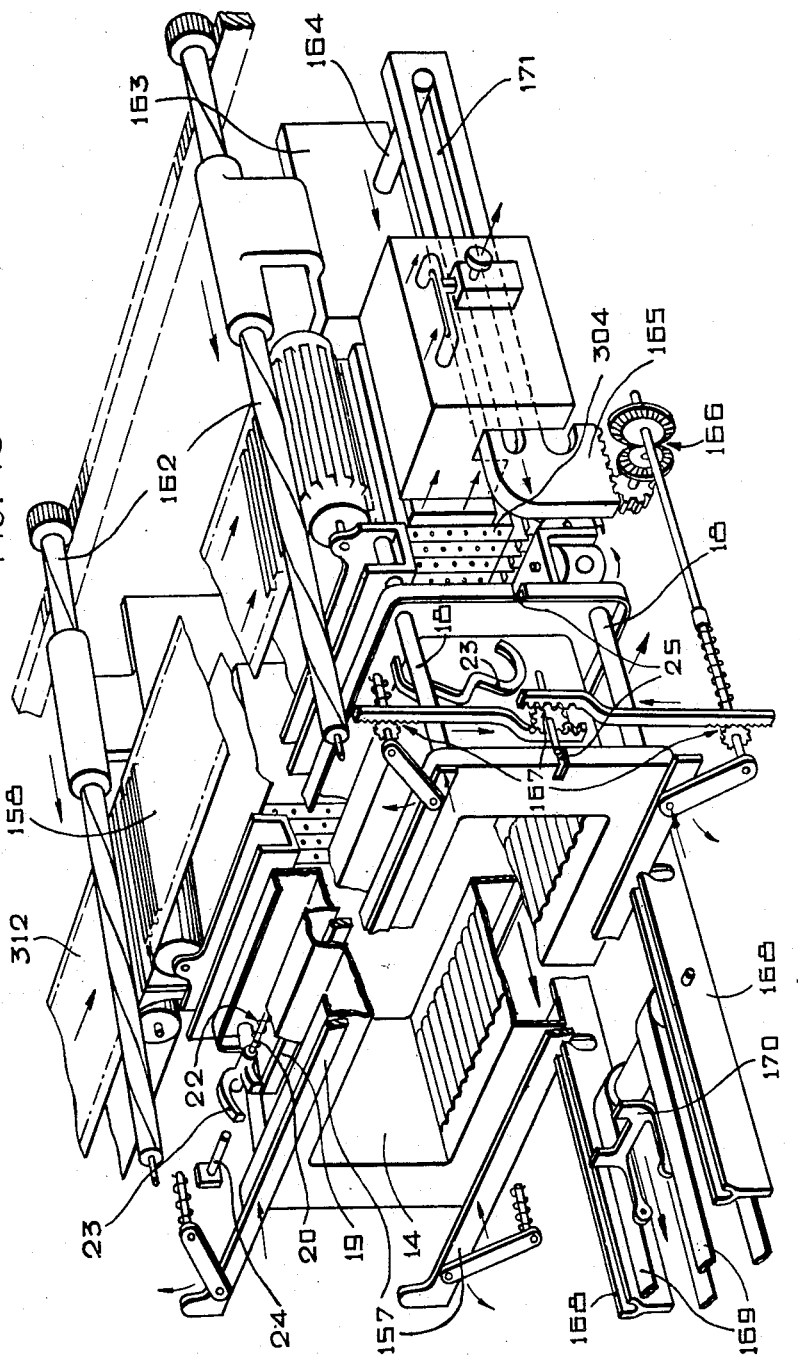

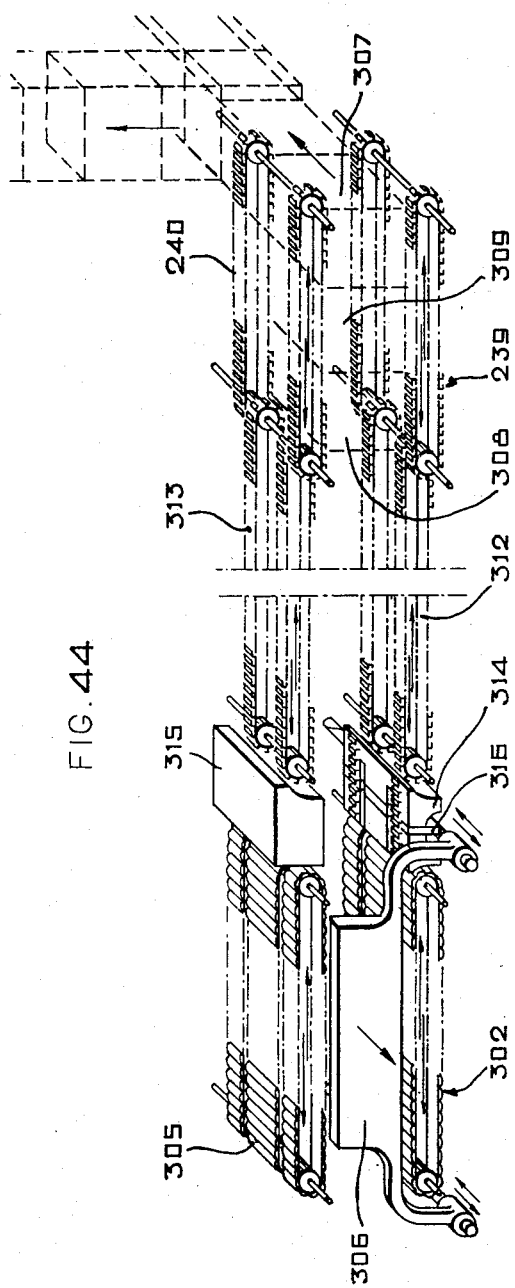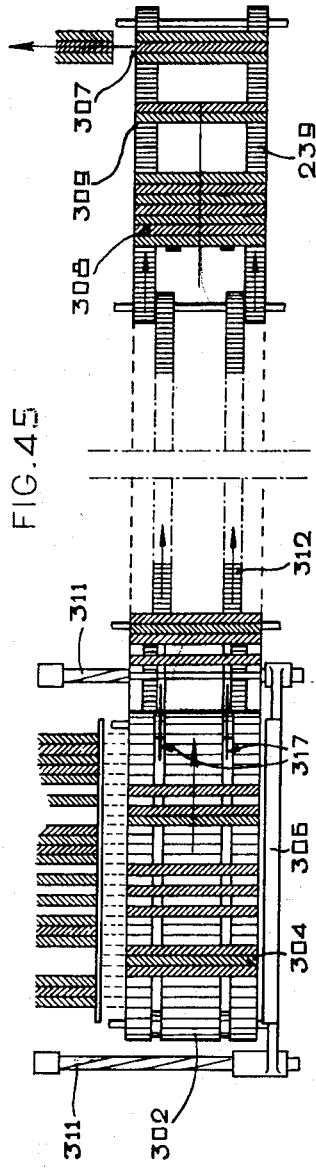

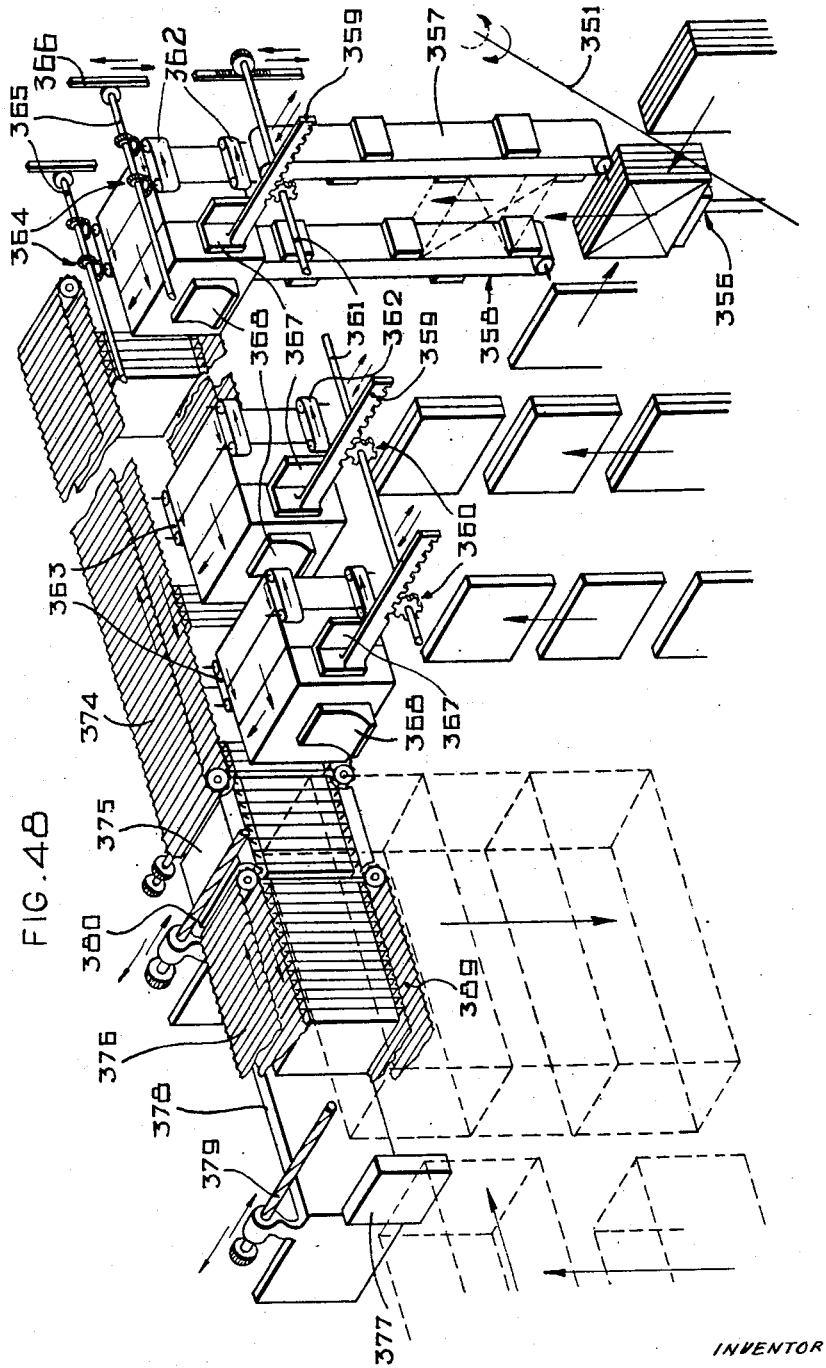

Dec. 14, 1954 R. GOURDON 2,696,919
MEANS FOR THE SORTING AND CLASSIFICATION
OF DOCUMENTS OR ARTICLES
Filed March 30, 1948 25 Sheets-Sheet 24

INVENTOR
Robert Gourdon
By Corey & Jacobs
ATTORNEYS

Dec. 14, 1954     R. GOURDON     2,696,919
MEANS FOR THE SORTING AND CLASSIFICATION
OF DOCUMENTS OR ARTICLES
Filed March 30, 1948     25 Sheets-Sheet 25
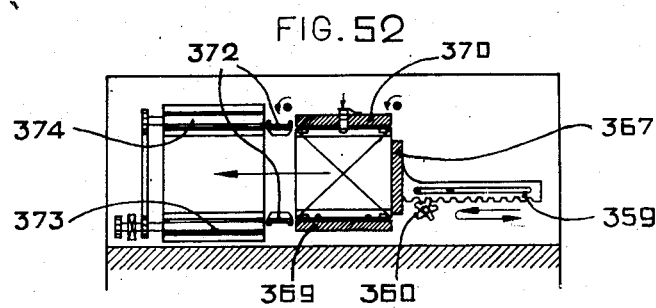
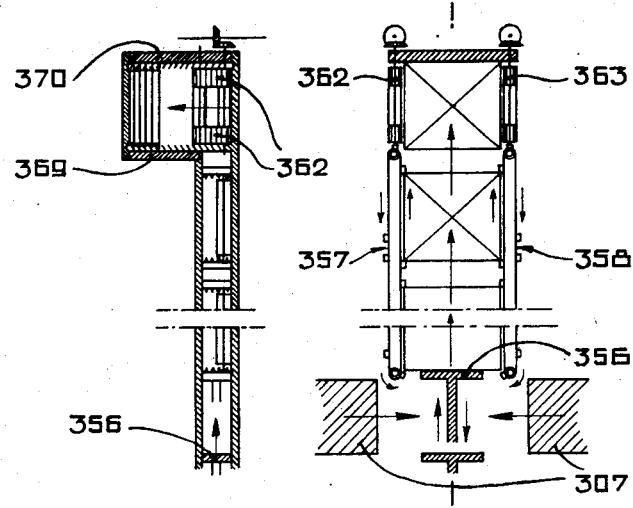
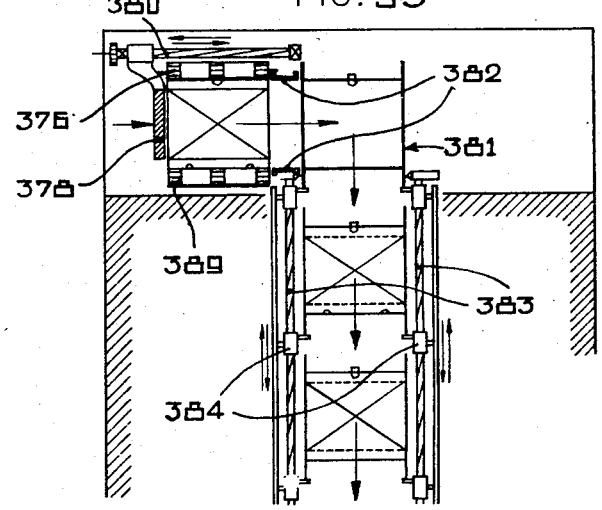
INVENTOR
Robert Gourdon
By Corey & Jacobs
ATTORNEYS

United States Patent Office 2,696,919
Patented Dec. 14, 1954

2,696,919

MEANS FOR THE SORTING AND CLASSIFICATION OF DOCUMENTS OR ARTICLES

Robert Gourdon, Paris, France, assignor to Centre d'Etudes M. B. A. (Mecanique, Balistique, Armement), Paris, France Application March 30, 1948, Serial No. 17,984

Claims priority, application France April 3, 1947

10 Claims. (Cl. 214—11)

The present invention deals with improvements, modifications and additions to methods and means for sorting and classification of documents or articles described in my co-pending application Serial No. 765,946, filed August 4, 1947, entitled Apparatus for Sorting Articles Such as Mail, now Pat. #2,669,365.

There is disclosed in said copending application a method and apparatus for sorting mail in which the individual letters are placed in individual receptacles, each provided with settable code indicating means. The receptacles are filled with letters at an indexing station, where an operator actuates suitable coding apparatus to set the code indicating means on each receptacle. The code indicating means is set in accordance with the address on the letter with a code corresponding to a particular distributing bin in which the letter is to be finally deposited at the end of the classification process. After a suitable number of receptacles have been filled and coded they are assembled into a frame and locked there with the code indicating means of all the receptacles visible and accessible through an open side of the frame. This frame is referred to as a block. Such blocks form the units for transportation of groups of receptacles through the sorting apparatus.

Each block passes from an indexing station to a sorting station, which may be either a preclassifying cabinet or a distributing cabinet. In the sorting station, the receptacles are unlocked and separated into groups by successive extraction operations. Each extraction operation takes from the block all receptacles having a certain setting of their code indicating means. In a preclassifying cabinet, the extracted groups of receptacles are reassembled into new blocks. This reassembling of the blocks may take place once or several times, depending upon the requirements of a particular installation. In a distributing cabinet, each group of extracted receptacles is emptied and the letters discharged are transferred to a mail bag, bin, or other suitable place of disposition. The preclassifying cabinet performs an intermediate step in the classification process, and the distributing cabinet performs the final step. Each operator at the indexing station sets his own pace, filling and coding the receptacles at a speed convenient to him. In the preclassifying and distributing cabinets, the operation is entirely automatic and proceeds at a fixed rate which is independent of the speed of the indexing station or stations.

An object of the present invention is to provide improved apparatus for sorting and classification of the type shown in the aforesaid copending application, as well as certain improved arrangements of stations for indexing, for preliminary classification, and for distributing. A further object is to use a minimum number of receptacles and separate blocks, while giving complete satisfaction as to any conditions of distribution of the documents to be sorted according to their destination, and under any circumstances that may give rise to a temporary stoppage of one or more stations of the plant, or of one or more stages of such stations.

In said copending specification, no exact details are disclosed for the means employed for supplying the indexing and sorting stations with blocks and empty receptacles, as required. Neither is there any disclosure of apparatus for handling the empty blocks in the preclassifying cabinets or for handling the empty blocks and receptacles in the distributing cabinets. These operations, as a matter of fact, could be done by hand.

According to the present invention, however, these operations are carried out automatically and controlled through operations effected in the cabinets or stations for indexing, pre-classifying and/or distribution.

According to another characteristic of the present invention, a complete plant, in which all operations (apart from indexing), are carried out automatically, is constructed as to make use of only a minimum number of blocks and receptacles. For this purpose there are provided special means for handling blocks and receptacles in the working stations and in the conveyors by which the blocks are transferred between the working stations.

The foregoing and other objects of the present invention are embodied in the following features, taken separately or in combination, which are included in the indexing operation, or the pre-classification and distribution operations:

(1) The connection with each indexing cabinet of an auxiliary frame for the handling of blocks. Blocks loaded with empty receptacles are inserted into these frames according to the requirements of the operator. These blocks are unloaded automatically into the indexing cabinet as soon as the operator requires these receptacles. The empty blocks are then transferred to a waiting position and are later reloaded with receptacles which have been filled with documents or articles and coded.

(2) The admission into the indexing cabinet, through the agency of the above-mentioned auxiliary frame, of empty receptacles that still retain their former codes, and the provision, in this cabinet, of means for decoding a receptacle simultaneously with the coding of the next previous receptacle.

(3) The arranging in groups of the assemblies of indexing cabinets and auxiliary frames (hereinafter called individual indexing stations) so that they are all served by one or several distributor-collectors which are adapted to bring the blocks of empty receptacles to the frames and to remove from them blocks of loaded receptacles.

(4) The automatic introduction into the auxiliary frames through this distributor-collector of blocks containing empty receptacles (not decoded) under the control of the lack of blocks at the receiving position of the frames. The automatic withdrawal from the frames through the distributor-collector, of blocks containing receptacles, coded and loaded with documents, under the control of the presence of loaded blocks at the discharging positions of the frames and also of the availability on the distributor-collector of a vacant position for taking these blocks. The automatic introduction of blocks into or their withdrawal from this distributor-collector by conveyors either vertical or horizontal, coming from distribution cabinets or leading to these cabinets or to cabinets for intermediate sorting.

(5) The provision, in the distribution cabinets, of a handling circuit for the receptacles relieved of their envelopes, comprising, at each stage of distribution, closing stations for these receptacles, and stations for partial arranging in groups per stage, means for directing these groups of empty receptacles to the upper stage of the cabinet, a station for the general rearrangement in groups of the empty receptacles, with waiting chamber and a station for reloading the receptacles into the empty blocks that are brought there after unloading their receptacles upon their receipt by the cabinet; after which the blocks thus reloaded are headed for the individual indexing stations. The provision, in the cabinets for intermediary sorting or pre-classification, of means for directing the blocks that have been relieved of receptacles to stations for reloading with pre-classified receptacles, these means being such that they automatically ensure the feeding of the reloading stations with empty blocks in proportion to the varying flows of pre-classified receptacles to these stations.

According to other characteristics of the invention, especially favorable arrangements are provided in the construction of the blocks and of the cabinets, to ensure the effective operation of the previous characteristics.

These various characteristics in addition to other ones as well, will be disclosed in detail in the following description of examples of adaptation to post office sorting illustrated in the accompanying drawings, in which:

Figs. 3 and 4 illustrate two modifications of the arrangement of the lower floor seen in Fig. 2.

Fig. 5 illustrates an enlarged portion of Fig. 2 showing somewhat diagrammatically the mechanism for transferring blocks loaded with receptacles to the revolving distributor-collector;

Figs. 6 and 7 show somewhat diagrammatically two details of the transfer mechanism of Fig. 5;

Fig. 8 shows in perspective a block suitable for use in the new method and apparatus herein seth forth;

Fig. 9 is a sectional detail view of the mechanism for locking receptacles in the block of Fig. 8;

Fig. 10 is a perspective illustration of an individual indexing station including an indexing cabinet and an auxiliary block handling frame;

Fig. 11 shows an elevational cross-section of Fig. 10 taken along the front panel of the auxiliary frame;

Fig. 12 is a partial longitudinal section of the auxiliary frame of Fig. 11 in which only the upper, or block receiving section, and the lower, or block discharging section, are shown, together with adjacent portions of the distributor-collector;

Fig. 13 illustrates a longitudinal section of the indexing cabinet showing the mechanism that ensures the simultaneous forward motion of the empty receptacles towards the identifying station and the discharge of the identified receptacles to the waiting chamber for loading into a block;

Fig. 14 is an elevational section of the mechanism connecting the index controller and the apparatus for coding the receptacles;

Fig. 15 is a transverse view and Fig. 16 a longitudinal section of the mechanism of Fig. 14, showing the apparatus for coding and decoding;

Fig. 18 is a perspective view on an enlarged scale, of a bevel mechanism for moving the blocks in a vertical direction;

Fig. 19 is a plan view of the same mechanism but with the block of Fig. 18 in its locked position before or after a vertical movement;

Figs. 20, 21 and 22 illustrate details of the mechanism of Fig. 18 in different operational positions;

Fig. 24 illustrates in perspective the mechanism for moving a block through various steps in a pre-classifying cabinet;

Fig. 25 is a sectional view of a portion of the mechanism illustrated in Fig. 24;

Fig. 26 is a perspective view of a guide forming a part of this mechanism, of which

Fig. 31 is a diagrammatic view, partly in section, of a mechanism in the pre-classifying cabinet for shifting a block between a sidewise horizontal and a vertical movement;

Fig. 32 is a perspective view of the means for supporting the blocks during their downward movement;

Fig. 33 shows in perspective a portion of the driving mechanism which moves the blocks vertically;

Fig. 34 shows a fragmentary horizontal sectional view and Fig. 35 a fragmentary end view, of a mechanism for changing the direction of movement of the blocks in a horizontal plane;

Fig. 35A is a fragmentary plan view of a caster track used in conection with the mechanism of Fig. 35;

Figure 42:
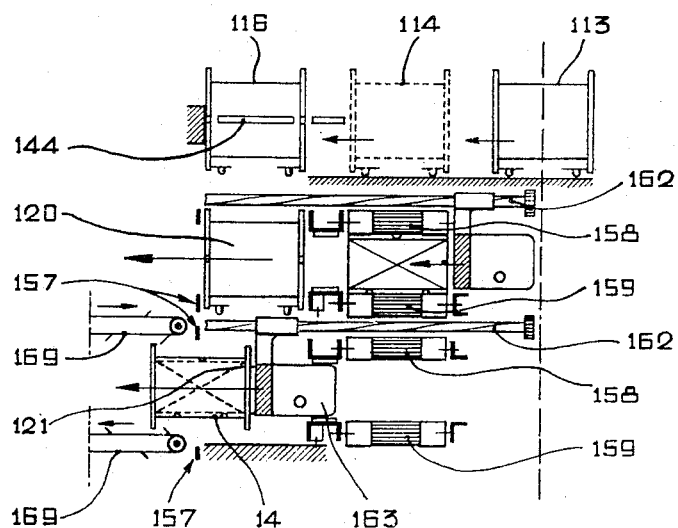
Figure 46:
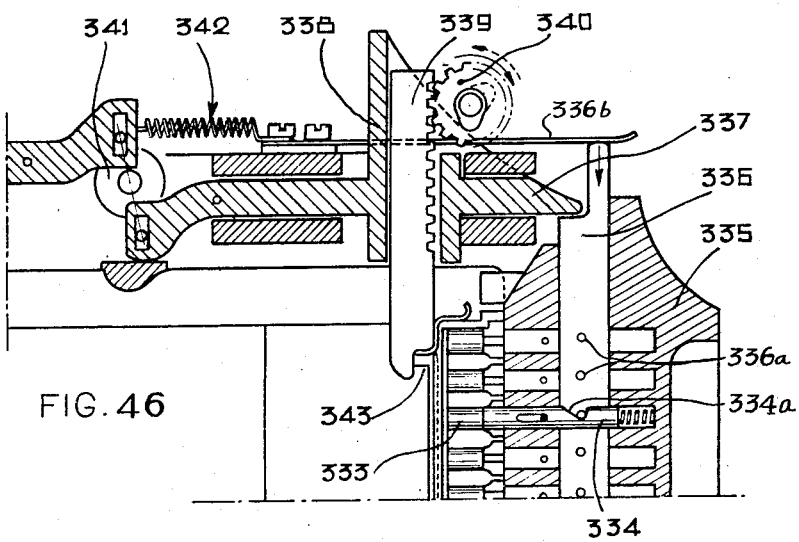
Figure 40:
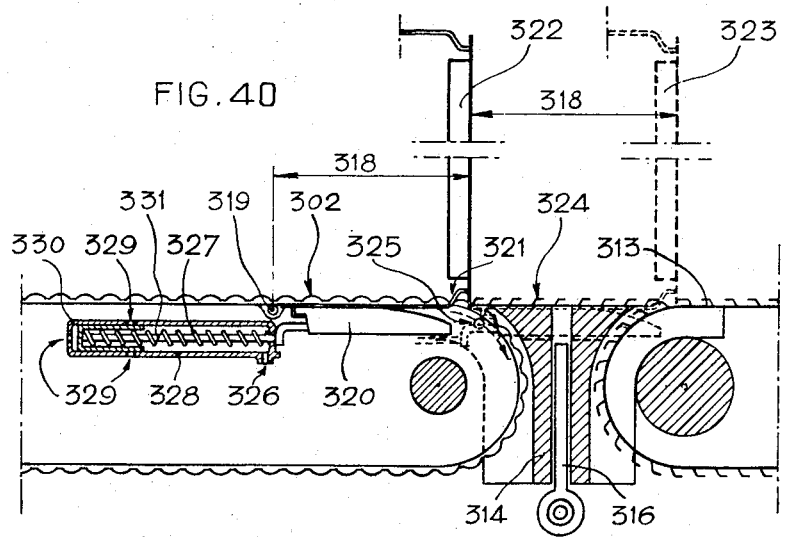
Figure 41:
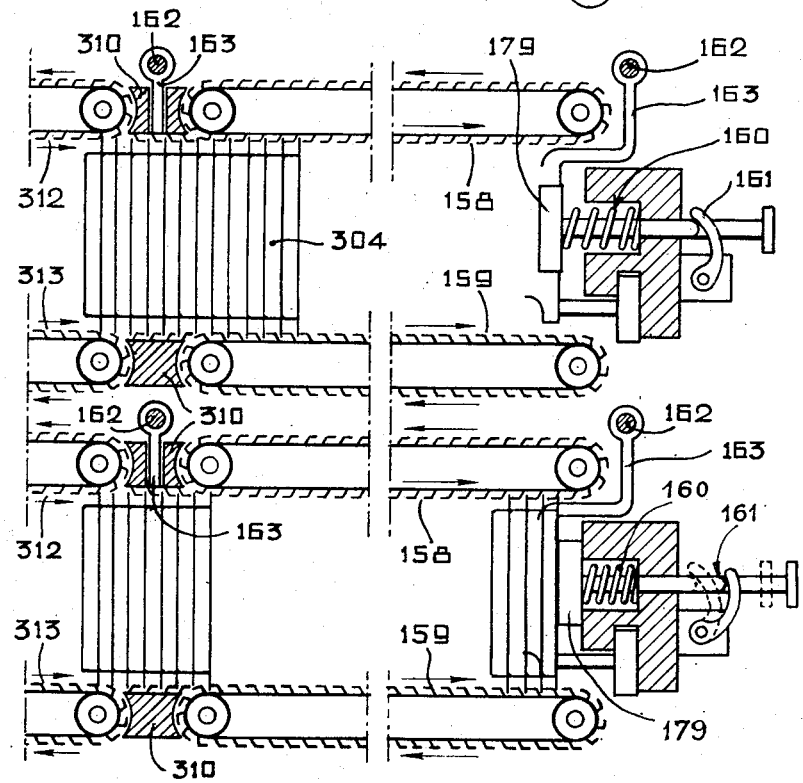
Figures 47, 49:
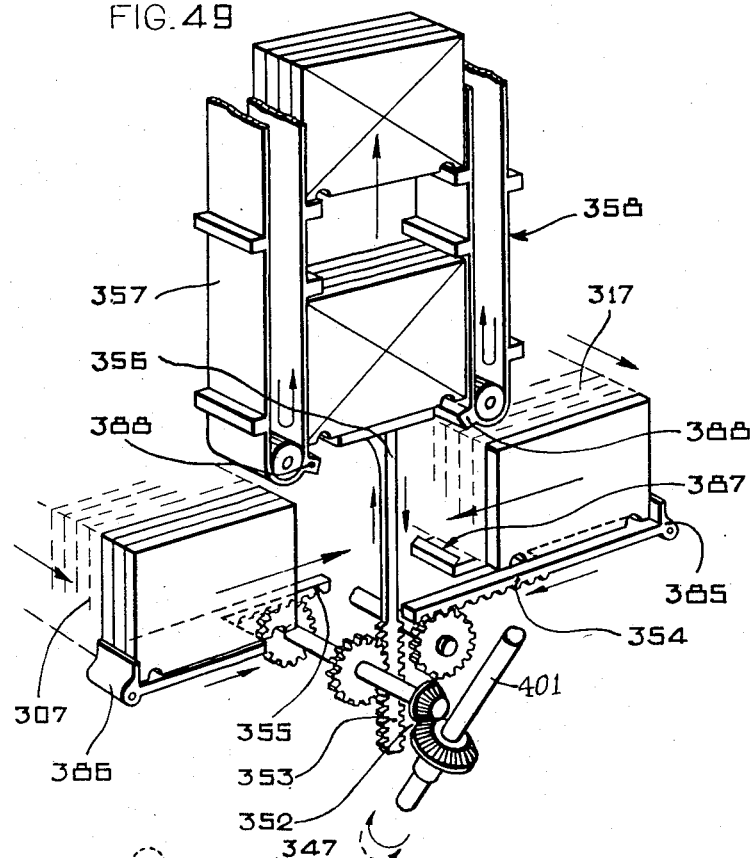

Fig. 38, in perspective, and Fig. 39, in plan, show the conveyor mechanism for transferring receptacles from an extracting station where they are classified by selective extraction from the blocks to a reloading station, where they are reloaded in previously emptied blocks;

Fig. 40 is an enlarged sectional view of the detail of the mechanism of Fig. 38, showing a bridging device that ensures the continuity of the movement of the receptacles between the ends of two adjacent conveyor belts;

Fig. 41 is a sectional view showing the controlling and driving mechanism for transferring receptacles to two reloading stations;

Fig. 42 is a diagram of a portion (right or left) of a pre-classifying cabinet showing the general arrangement of the mechanism for reloading the blocks;

Fig. 43 gives a perspective view of a complete station for reloading blocks;

Fig. 44, in perspective, and Fig. 45, in plan, show, somewhat diagrammatically, the parts for the handling of the receptacles in a distributing cabinet, from a withdrawal station up to a rearrangement station;

Fig. 46 is an enlarged detail of the mechanism for opening the receptacles at a station for unloading the envelopes;

Fig. 47 is an enlarged detail of the mechanism for closing the receptacles after they have been emptied;

Fig. 48 is a simplified diagram in perspective showing the various stages of rearrangement of the empty receptacles;

Fig. 49 is a perspective diagrammatic view of the central portion of the mechanism for rearranging receptacles leaving one level of a distributing cabinet;

Figs. 50 and 51 show a side view and front view respectively of the general layout of a portion of means for rearrangement of the empty receptacles;

Fig. 52 is a fragmentary side view of the mechanism for rearrangement, at the upper floor of the cabinet, of all the receptacles coming from the distributing floors; and Fig. 53 shows in part section, the mechanism for reloading the empty receptacles in the blocks and the start of the downward movement of these blocks for their return to the individual indexing cabinets.

Figure 1:
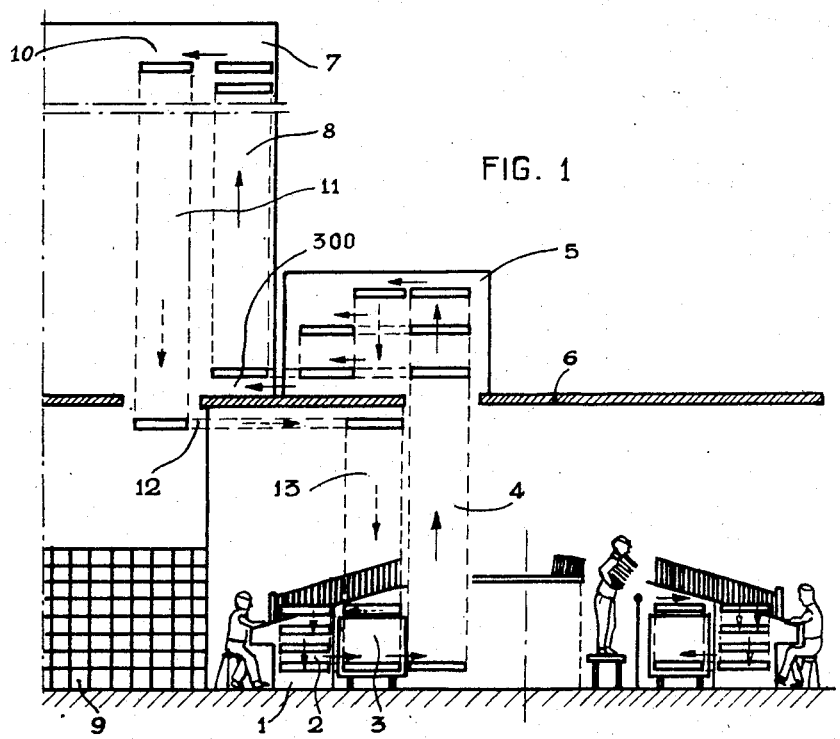
Fig. 1 is a somewhat diagrammatic elevation partly in section, of a complete plant for sorting and classification embodying the present invention.
Figure 2:
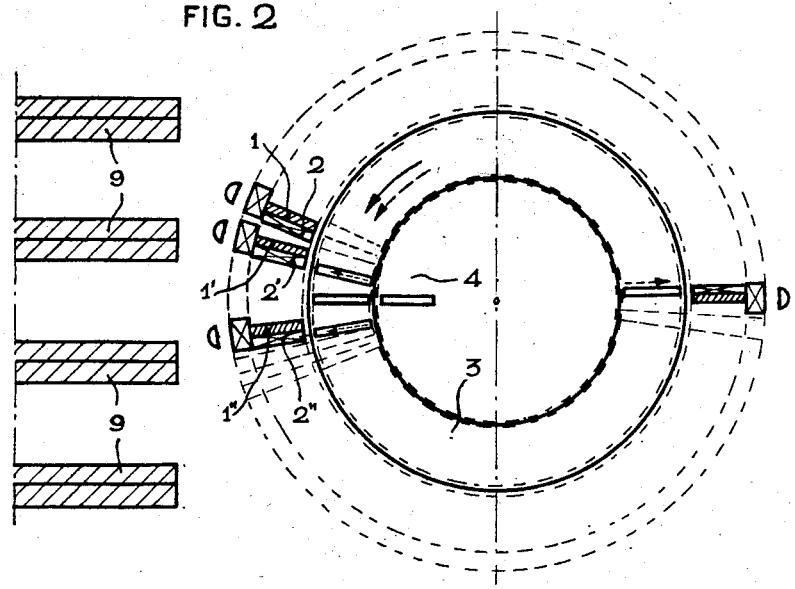
Fig. 2 is a somewhat diagrammatic plan view of the lower floor of the plant shown in Fig. 1.

The arrangement shown in Figs. 1 and 2 is a practical installation of a postal sorting office for putting into operation apparatus and methods provided in accordance with the present invention.

As best seen in Fig. 2, a number of individual indexing stations are arranged around the periphery of a circle. Each indexing station comprises an indexing cabinet, such as 1, 1', and an auxiliary block handling frame, such as 2, 2'. Figure 10 shows a perspective view of an indexing cabinet 1 and its associated auxiliary frame 2. Figs. 6–22 show various details of the construction of such apparatus. Operators sit at the indexing cabinets 1 and operate the coding mechanism of the indexing cabinet to set the codes on the individual letter receptacles in accordance with the addresses on the letters which are placed in the respective receptacles. The auxiliary frames 2 receive incoming blocks of empty receptacles from a block distributing and collecting mechanism 3, hereinafter referred to as a distributor-collector. The auxiliary frames 2 also hold blocks of filled receptacles and transfer them at intervals to the collector.

The distributor-collector 3 is shown as an annular table having two tiers arranged one above the other and mounted on trucks for angular movement about the center of the circle of indexing stations. The tiers of the distributor-collector 3 move in close proximity to the backs of the block-handling frames 2, to facilitate movement of blocks between the frames and the tiers of the distributor-collector.

The upper tier receives blocks of empty receptacles from a downwardly traveling vertical conveyor 13 and distributes them to the upper tiers of the block handling frames 2. The lower tier receives blocks of filled receptacles from the lower tiers of the block handling frames 2 and discharges them to an upwardly traveling vertical conveyor 4.

This collector 3 is actuated so as to assume a periodic intermittent movement of rotation. The time required for one revolution of the distributor-collector 3 is made slightly less than the minimum time required for an operator to load up a block with receptacles so that a loaded block will be picked up by the distributor-collector before the operator has finished loading the next block.

As the collector 3 turns, its lower tier passes the lower end of a rising conveyor 4, and any block on the lower tier is transferred to the conveyor 4. Conveyor 4 is intermittently driven in unison with the collector 3, and is capable of receiving blocks as fast as the collector can deliver them.

Each block on the lower tier travels on the collector 3 only until it reaches the conveyor 4. The length of that travel depends upon the relative angular position of the indexing station where the block was loaded and the conveyor; but is never more than one revolution. As the collector rotates, all the blocks it picks up are transferred to the conveyor 4 which moves them through the ceiling 6 to a pre-classifying cabinet 5.

In the installation of Fig. 1, the blocks move through the pre-classification cabinet 5 in a manner to be described more fully hereinafter, and are then selectively transferred to one of several distribution cabinets 7. The distribution cabinet 7 includes a rising conveyor 8 which raises the blocks upwardly in steps through several tiers. At each tier, the receptacles in the block are selectively extracted from both sides of the block, in accordance with their respective codes, that is, blocks bearing a particular code are extracted at one particular extracting station only. The receptacles extracted at each extracting station are therefore completely classified. These receptacles then pass through an opening apparatus where their contents are emptied into conduits leading to repositories or bins 9, located on the lower floor. The blocks reaching the topmost tier are completely empty and are there reloaded with empty receptacles and come down again along the line of travel 11 to horizontal conveyor 12 (located for instance against the ceiling of the lower floor) and are picked up by a descending conveyor 13 that brings them directly to the upper tier of the distributor-collector 3. This distributor-collector distributes them according to the requirements of the individual indexing stations arranged around it. This distribution, that is moreover quite automatic, will be explained later on.

The feeding of the individual indexing cabinets with unsorted mail may be accomplished to advantage from the area within the distributor-collector as shown in the diagrammatic drawing.

Instead of a radial arrangement of the individual indexing cabinets, any other design may be adopted that might prove advisable to fit in with the arrangement of the premises assigned to a given plant.

Two examples of this are shown in Figs. 3 and 4. In these figures will be found again the stations or cabinets 1, 1 etc. laid out in a rectilinear manner in single parallel series, Fig. 3 or in multiple arrangement, Fig. 4.

The distributor-collectors may in such cases be formed of endless straight-line belts actuated with the same intermittent movement as outlined previously for Fig. 1. It is clear that in these two cases additional connections are essential between the distributor-collectors and the rising and descending conveyors.

Such plants obviously are not restricted as to physical arrangements but emphasis is laid on the flexibility of the general method of procedure as set forth in this specification.

Having thus outlined certain general plant arrangements, and the general characteristics of the various cabinets and mechanical features employed for operating a system of classification in accordance with my invention, I will now describe in detail the various individual features of my invention, which features include special apparatus inside each unit of the apparatus and other special apparatus between the various units.

Certain improvements have been made in the construction of the blocks so as to embody therein devices suitable for the automatic handling conditions to be described.

Figs. 8 and 9 show plainly the improved block construction. A block is formed by a box 14 with the two opposite sides open, and having the inner surfaces of its top and bottom corrugated or grooved as shown at 15 to receive the edges of the receptacles and hold them in position. Side plates 16 and 17 insure mechanical stiffness of the blocks and also cooperate in the exact positioning of the blocks at their various working stations. Hollow cross-braces 18 are provided between the side plates at the four corners and at the center of the block, as shown. These hollow cross-braces 18 serve, as will be observed, to ensure a precise stopping position and an accurate centering of the block at the positions for loading and withdrawal of the receptacles and also to simplify the transfer of the blocks from one conveyor to the next.

Once all the receptacles are in position in a block they are clamped by a rod 19 as soon as the block starts moving. The device for locking and unlocking this rod includes a shaft 20 carrying fingers 21 capable of acting on the rod 19. The shaft 20 is biased in a rotary direction by a spring 22. The shaft 20 carries at its ends bent arms 23, one of which is shown in Figs. 8 and 9.

When the block moves in front of a fixed finger as shown at 24 in Fig. 9, the bent piece 23 will be pushed in one direction or the other and on account of this angular movement the fingers 21 will engage or disengage the locking rod 19, which will release or lock the receptacles according to requirements.

Notches 25 are provided in the end portions of the side plates 16 for guiding and supporting the blocks in certain operations, particularly during transition between a horizontal translational movement and a vertical translational movement. The plane of these notches 25 is provided so that a member inserted into them does not engage the arm 23.

In addition each block is provided with four casters 26 set in swivel supports 27. These casters support the blocks during any transverse or longitudinal translational movement in the horizontal plane, the casters running on rails or in grooves fitted for this purpose.

A block formed in this way, loaded with empty receptacles, is brought to one of the individual indexing stations by the distributor-collector 3 and is put in the upper tier of frame 2 coupled to the indexing cabinet 1, (Figs. 10 and 11). This frame 2 has four tiers of which the topmost and lowermost tiers 31 and 32 are waiting stations. The two intermediate tiers 28 and 29 are working stations. The station 28 is the station for unloading the empty receptacles into the indexing cabinet and the station 29 is the station for loading the filled and coded receptacles into the block.

The empty receptacles delivered from the stage 28 to the indexing cabinet still carry the code of the previous operation, and are decoded, then recoded in the indexing cabinet by means of coding mechanisms 30. The receptacles that are delivered from the indexing cabinet 1 to the station 29 have each received an envelope and the code has been set on the code indicating means of the receptacle to correspond to the destination of the envelope. Fig. 12 shows the connection of the upper and lower stages of the auxiliary frame 2 with the collector-distributor. A block loaded with empty receptacles is brought to the upper station 31 from the distributor by means of the mechanism shown in the upper portion of Fig. 12. This mechanism is provided with a worm 33 carrying a nut 34 which is guided against rotation. The worm is driven in opposite directions at a rate fast enough so that the nut 34 can complete a round trip from one end of the worm to the other and return in one of the dwell periods of the distributor-collector 3. The starting of the worm is coordinated with the operation of the frame 2 so that the worm starts only when the tier 31 is vacant or being vacated. As long as tier 31 is vacant, nut 34 makes a round trip during each dwell period of the collector-distributor.

On the nut 34 is pivoted a bell crank lever 35 having a hook 35A formed on its downwardly extending arm and carrying a pair of rollers, one of which is shown at 36, on its upwardly extending arm. The rollers 36 cooperate with fixed member 38 on the auxiliary frame 2 and a pair of slides 37A and 37B (Fig. 5) which are positioned adjacent the radially inner end of the member 38, as it appears in Figure 5. The bell crank lever 35 is rocked about its axis during the movement of the nut 34, the rocking movement being controlled by the member 38 and the slides 37A and 37B. The slide 37A is positioned by a mechanism illustrated diagrammatically in Figure 7 which spots or senses the presence of a block on the distributor 3 in position to be transferred to the receiving station 31 of the auxiliary frame 2. The slide 37B is positioned by a mechanism shown diagrammatically in Figure 6 which spots or senses the presence of a block in the receiving station 31.

In Figure 12, the receiving station 31 is occupied by a block. The arm 39 in Figure 6 is then engaged by a suitable part of the block and acts through a segmental pinion and a rack on the slide 37B to position the slide at its radially inner position, corresponding to that of the slide 37B associated with the auxiliary frame 2 at the right hand side of Figure 5. The presence of the slide 37B in this position, which corresponds to the position of the slide 37 in Figure 12, holds the roller 36 and the bell crank lever 35 in the positions shown in full lines in Figure 12 as the nut 34 reaches the left hand end of its travel, so that the hook 35A does not drop. Consequently, the mechanism does not attempt to move a block from the distributor into the receiving station 31 during the subsequent travel of the nut 34 to the right.

The slide 37A (Fig. 7) is positioned by a sensing shutter 40 carried at the end of a lever 41 hinged at 42 on the auxiliary frame 2. This shutter extends into the path of the blocks carried by the distributor 3, and is lifted by each block on the distributor 3 as it moves into position in line with the auxiliary frame 2. The lever 41 carries a stud 43 which cooperates with a pin on the slide 37A. As the lever 40 is lifted by a block 14, the lug 43 moves the slide 37A to its radially outer position, as shown in the case of the slides 37A in the right hand and central portions of Figure 5.

In the case of the slides 37A and 37B associated with the auxiliary frame 2' appearing in the center of Figure 5, it may be seen that both these slides have been moved to their radially outer positions. The presence of slide 37B in that position indicates that the receiving station 31' is empty, and the presence of slide 37A in that position indicates that a block is in position on the distributor 3 ready to be moved into the receiving station 31'. On the next radially inward movement of the nut 34 associated with that auxiliary frame 2', the rollers 36 will both move off the ends of the slides 37A and 37B, allowing the hook 35A to drop behind the crossbar 18 and on the following outward movement of nut 34, the block is drawn from the distributor into the receiving station 31'. When the worm 33 reverses and starts driving the nut 34 outwardly or to the right, as shown in Figure 12, the slides 37 and member 38 engage the rollers 36 and hold the hook 35A under the crossbar 18 so that the block is drawn to the right in Figure 12 and moves into the receiving stage 31 of the adjacent auxiliary frame 2.

When the block is moved fully into the receiving station 31, then the roller 36 moves off the right end of member 38, reaching the position shown in dotted lines at the upper right of Figure 12. When the worm 33 is reversed and drives the nut 34 to the left again, the roller 36 engages the end of member 38 and the bell crank lever 35 is rocked in a clockwise direction to approximately the angular position shown at the left of Figure 12, wherein the hook 35A is lifted so that it will not engage any of the cross-bars 18.

From the foregoing it should be apparent that the hook 35A will drop to engage a block only when there is no block in the receiving station and a block is waiting on the distributor for transfer to the empty receiving station. If the receiving station is empty, and there is no block on the adjacent portion of the distributor, then the conditions will be as shown in the case of the auxiliary frame appearing at the left hand side of Figure 5.

Movement of the blocks inside the frame 2, Figs. 11 and 12, is controlled by the operator of the individual indexing cabinet 1 and depends on the operator's working speed.

A block at station 31 may move down to station 28 only when the latter is empty.

The block in station 28 may only come down in its turn to station 29 after the block in the latter station has received a set of filled receptacles and has moved down to station 32. The discharge of blocks from station 32 to the collector 33 is carried out by a mechanism shown in the lower portion of Fig. 12, which corresponds to the mechanism that has been disclosed for drawing a block from the distributor to the receiving station 31 of the auxiliary frame.

The movements of the nuts 34 on their worms 33 may either be timed with the intermittent movement of the distributor-collector, or else made dependent on the downward movement from 29 to 32 as mentioned already.

The removal of the blocks from the station 32 is controlled by the presence of an empty space on the collector. The stopping period of a block at station 32 is always less than the time required for the loading of an empty block in station 29. In other words, the station 32 is always free when a block in station 29 is loaded and ready to be moved.

A block loaded with empty incoming receptacles is always locked in position 31. When it comes down into position 28, the arm 23 bears against a fixed stop such as 24, (Figs. 9, 10 and 11) which causes the piece 23 to rock and unlocks the receptacles so that they may be withdrawn from the block by an extractor device that will not be disclosed in detail here since it may be similar to the extractor device of the pre-classifying and distributing cabinets in the aforesaid copending application. The only variation between these mechanisms lies in the fact that these extractors are not controlled by a code.

The extractors 46 (Fig. 11) are supported on the upper ends of bridges 47 and 54 (Figs. 11 and 13) which carry at their lower ends rams such as 48, Fig. 11, in the same vertical plane.

When a fixed number of receptacles has been brought into the lower position 49 of the individual indexing cabinet, after having received an envelope and having been coded according to the destination of this envelope, a relay controlled by a push button shown schematically at 50 in Fig. 13, starts the worms 51 and 52 in the proper direction to drive the nuts 53 on the bridges 47 and 54 along the worms 51 and 52 toward the right as viewed in Fig. 11. The pusher member 48 then delivers said fixed number of receptacles into the empty block stationed at position 29. The locking mechanism of the receptacles in this block is held open by the stop 55. As the nuts 53 reach the right hand end of their travel, the extractors 46 engage with the empty receptacles contained in the block drawn up at position 28. In the return journey these extractors then draw a set of empty receptacles out of the block in position 28 and bring them into position 56 where the extractors release the receptacles. The receptacles are moved from station 56 to the left as shown in Fig. 13 to position 58, where they are loaded and coded. The movement of receptacles from station 56 to position 58 is concurrent with the movement of loaded receptacles from position 67 (below position 58) to station 49. This concurrence is established by an endless and common belt 59 that is provided so as to be driven by the receptacles loaded with envelopes moving into the position 49 while drawing in the same period of time the empty receptacles into position 56.

Two additional belts 60 and 61, that form the other walls of the passage ways 56 and 49, have movements that are concurrent with that of the belt 59, so that the receptacles remain vertical.

After release of the receptacles, the electromagnetic starting of the movement for lowering of blocks comes into action. The blocks in position 28 and 29 then come respectively into positions 29 and 32.

The block that has been loaded and that was in position 29 is again locked at the beginning of the downward motion by the action of the stop 62, Fig. 11, which moves arm 23 in the position for locking the receptacles.

At the same time, the block that was waiting in the position 31 comes down to position 28 and stays there, but the receptacles are unlocked by the action of the stop 24 on the piece 23 as stated already.

The block that has been emptied at position 28 comes to position 29 waiting for a fresh load. the locking bar being raised by the action of the stop 55.

The movement has been started by contact of the previously mentioned electromagnetic device of which the working and the mechanism will be explained later on with reference to Fig. 14.

In the assembly that has been disclosed, it is important to observe the following special point. The ram 48 (Fig. 11) is provided with a solid flange 64 which extends to the left as viewed in Fig. 11 so that when ram 48 is moving a set of receptacles from station 49 to station 29, the flange 64 separates the receptacles entering station 49 from the set being moved. A waiting chamber for a certain number of receptacles is shown at 58 (Fig. 13). When a complete set of receptacles is in position 49 waiting for ram 48 or being pushed by ram 48 toward position 29, the next receptacle in waiting chamber 58 may be loaded by the operator and will come down that path shown by the arrow 65 to a position in front of the pusher 66. The pusher 66 merely moves this receptacle against the flange 64 of the ram 48 which separates the first receptacles of a new lot from those being moved from the station 49 into the block at station 29. Then, the pusher 66 recedes to allow the next succeeding receptacle to drop in front of it. On its next movement to the right in Fig. 13, pusher 66 will move the second receptacle against the first one. A compensating spring not shown in Fig. 13 restricts the pressure of the pusher 66. A similar action takes place with respect to the following receptacles entering this cooperating waiting chamber 67.

The waiting chamber 58 is thus emptied while the waiting chamber 67 fills up. The filling of these receptacles occupies the time required for the ram 48 to transfer a lot of receptacles from the station 49 to the block in station 29, and then return to its normal position. Then the next operation of the pusher 66 moves the receptacles from the waiting chamber 67 in between the belts 59 and 61. The belt 59 is thus driven and causes a similar number of empty receptacles to be brought into the waiting chamber 58.

The operations by which the receptacles in the waiting chamber 58 are loaded have been disclosed already in the aforesaid copending application.

Apparatus is provided in each individual indexing cabinet for decoding each receptacle simultaneously with the coding of the receptacle that is just ahead of it.

The simultaneous coding and decoding is performed by a coding mechanism 30, (see Fig. 10) shown in greater detail in Figs. 14, 15 and 16.

In these figures is shown at 68 a controller such as disclosed, for instance, in the application for a French patent lodged on January 16, 1946 by Centre d'Etudes M. B. A. and entitled "Electro-Mechanical device for controlling pre-determined movements of parts and controllers embodying such devices" and in the corresponding application for United States Letters Patent Serial No. 722,196, filed January 15, 1947, entitled "Electromechanical Device for Governing Pre-determined Changes of Positions", now U. S. Patent No. 2,469,035 issued May 3, 1949.

In such a controller, a number of electromagnetic devices, indicated diagrammatically at 70 in Figure 14, are effective to predetermine selectively the longitudinal displacement of a corresponding number of circumferentially spaced rods 69, which are driven at intervals by an axially located rod 71 controlled by the operator of the indexing station. The rod 71 may be actuated either manually or through a suitable power operating mechanism. As each rod 69 moves to the left as it appears in Figure 16, it engages a lever 83 and thereby drives a rack bar 73 upwardly. The displacement of the respective rods 69 and hence the extent of upward movement of the respective rack bars 73 is determined by the particular combination of electromagnets 70 which are energized. The selection of such combinations is determined by the operator in accordance with the address on a letter by actuating a selector switch mechanism such, for example, as those disclosed in my copending application Serial No. 722,197, filed January 15, 1947, now abandoned, entitled Apparatus for Indexing Articles. The particular combination of electromagnetic devices 70 selected predetermines the particular rods 69 which will be displaced upon the next displacement of the driving rod 71, and also predetermines the extent of displacement of the particular rods selected. Each rack bar 73 is provided with a short rack which engages a pinion 75 on one of a set of code screwdrivers 74. Each rack bar drives one corresponding screwdriver 74. Consequently, it may be seen that operation of the selector switch mechanism determines which of the code screwdrivers 74 are to be rotated and the extent of their rotation. Each screwdriver 74 is provided at its upper end as it appears in Figure 15 or its right hand end as it appears in Figure 14 with a slot adapted to engage a projecting rib on a code index member 76 housed in a lateral wall of a receptacle 77. The screwdrivers 74 are normally recessed within the frame of the coding mechanism, as they appear in Figures 14 and 15. All the screwdrivers are given a simultaneous forward movement out of the coding mechanism frame and into engagement with their respective index members 76 by means of a pusher 82 actuated by a rod 79 (Fig. 14). The movement of rod 79 is coordinated with the actuation of the controller 68 so that the pusher 82 is first operated to bring the screwdrivers into engagement with their respective index members just before rack bars are actuated to rotate certain of the screwdrivers. The index members 76 are releasably locked in various angular positions, as described more completely in my copending application Serial No. 722,198, filed January 15, 1947, now abandoned, entitled "Holders with Adjustable Identifying Codes and Arrangements Relating Thereto". When the index members 76 are in the positions illustrated in Figures 14 and 15, they are locked against rotation. When the screwdrivers 74 move into engagement with them, the index members are moved inwardly in the receptacles 77 and the locking is thereby released. When the screwdrivers are subsequently rotated by the rack bars 73, the corresponding index members 76 are rotated to predetermined angular positions. After the rack bars 73 have rotated the screwdrivers, the rod 79 and pusher 82 are released so that the screwdrivers 74 are withdrawn from the index members 76 by the action of the return springs 85. Disengagement of the screwdrivers from the index members allows the index members to move outwardly again and thereby locks them in the angular positions established by the screwdrivers. The new positions of the index members serve as a code to indicate the destination of the letter placed in the receptacle 77 which carries that code.

The rod 71 operates at each reciprocation a lever 84 which drives a rack bar 80 provided with teeth to engage pinions of a set of decoding screwdrivers 81. When one receptacle 77 is aligned with the coding screwdrivers 74, the following receptacle is aligned with the decoding screwdrivers 81. The decoding screwdrivers 81 engage and operate the opposite index members 76 concurrently with the operation of the coding screwdrivers 74. However, all the decoding screwdrivers 81 rotate through the same angle at each actuation. For example, each screwdriver may be rotated through one-half turn. Whatever the angular positions of the various index members 76 as they approach the decoding station, they are all engaged by decoding screwdrivers 81 and rotated to a decoded angular position which is preferably the same for all the index members. If an index member 76 has its rib at a different angle to that of the slot in the decoding screwdriver 81, then it will not be engaged by the screwdriver 81 when the latter first moves towards the index member. The end of the screwdriver 81 then turns on the end of the index member 76 without engaging it until their angular positions correspond, whereupon the slot on the screwdriver 81 engages the rib on the end of index member 76 and thereafter the two rotate together until the decoded position of the index member is reached. This decoded position corresponds to the initial angular position of the coding screwdrivers 74.

A similar decording and coding action takes place simultaneously with respect of a second set of index members 76 located on the opposite side of the receptacle. (Note the two oppositely located coding mechanisms 30 in Fig. 10).

Figure 17:
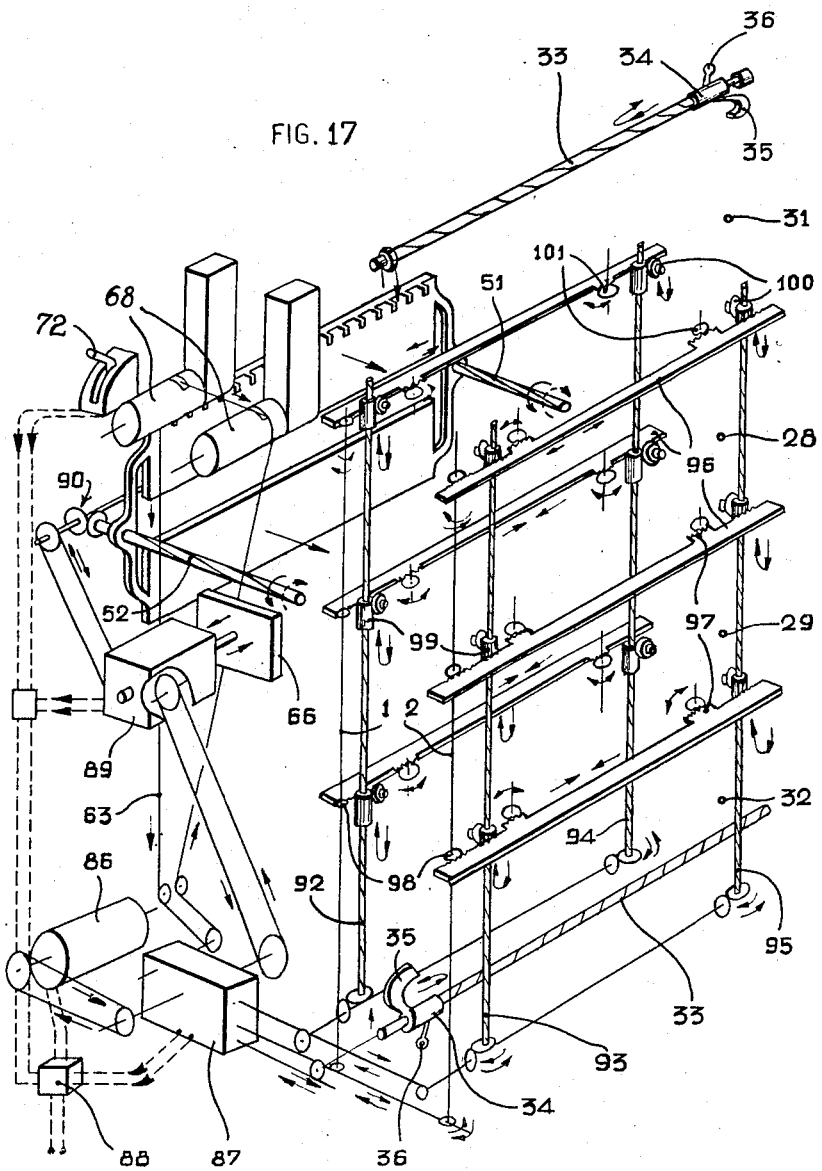
Fig. 17 illustrates a perspective view of the mechanism of admission, of advancement and of withdrawal of the blocks in the indexing cabinet of Fig. 10.

A general diagram of the operating mechanism of an individual indexing cabinet (with the exception of certain inner mechanisms dealing with the movement and cancellation of envelopes) is illustrated in Fig. 17. This diagram is intended to show the operation of the individual indexing cabinet and frame, by a single motor 86. The driving connections from the motor may be effected in any standard adequate manner but are illustrated as belt and pulley connections. The motor 86 drives a combination box 87 controlled from a distance on the other hand through the handle 72 for the recording of code combinations and is fed through an outer supply of energy, the mains for instance, through the junction box 88.

The following controls inside the cabinet are carried out from the box of combinations 87:

1. The control box 89 operates the pusher 66 delivering the loaded receptacles into the loading station 49 and also drives through a connection 90 the mechanism which delivers the receptacles from this station 49 into a waiting block at 29 and withdraws the empty receptacles out of a block stationed at 28 as explained previously;

2. The combining controllers 68 are driven by a belt 63;

3. The control of the mechanisms of the block handling frame, that is to say:

The intermittent reversing rotary movement in one direction and then another of the four worms 92 to 95 of which the starting up depends on the delivery and withdrawal of the receptacles, said worms ensuring the holding and the downward motion of the carry nuts 99 fixed rigidly with the rollers of the block supports.

The to and fro movement of predetermined amplitude of the crossbars 96 ensures the rotary motion of the nuts 99 and simultaneously through their rack portions 97 the directing of the members 101 serving to hold the blocks in position during the withdrawal travels of the nuts.

Each rod 96 ensures in addition the locking of a block in its standing position. The to and fro movement of the rods 96 is controlled by pinions 98 carried by the spindles 102 having an alternating rotary motion. These various mechanisms are illustrated in more detail in Figs. 18 to 22.

Each block as it moves into any one of the four positions 31, 28, 29 and 32 is supported by four segmental discs 101 (Figures 18, 19 and 22) carried on hubs 101*a* (Fig. 18) which turn on stub shafts 101*b*. Each hub 101*a* is provided with a segmental pinion 101*c* adapted to engage a rack 97 formed on a rack bar 96. Each rack bar 96 is formed with a second rack 96*a* which cooperates with a segmental pinion 107 on a nut 99 which is formed with internal worm threads and rides on a vertically extending shaft 102. The mechanism just described is duplicated at each of the four corners of the block handling frame, as illustrated diagrammatically in Figure 17.

The rack bar 96 also carries a lug 104 (Figs 19 and 21) which cooperates with the end of a spring bolt 105 moving in a bushing 103 (Fig. 21) fixed in a frame member 106. The opposite end of spring bolt 105 is provided with a tapered end which cooperates with the hollow end of a cross-bar 18 in a block. When the lug 104 engages spring bolt 105, it forces it to the left to the dotted line position shown in Figure 21, where it engages the end of the cross-bar and locks the block in position. When the lug 104 is moved to the right as it appears in Figure 18, or upwardly as it appears in Figure 21, it disengages the spring bolt 105, whose spring moves it to the right, thereby unlocking the block.

When the blocks are stationary in the block handling frame, they rest on the discs 101, which are then turned to the positions illustrated in Figure 19. When the conditions are proper for a downward movement of the blocks in the block handling frame, namely when the station 32 is empty and the block in station 29 has been loaded with filled receptacles, then the control mechanism 87 initiates the rotation of the shaft 102 in a counterclockwise direction as viewed in Figure 21, thereby driving the rack bar 96 to the right as it appears in Figure 18 or upwardly as it appears in Figures 19 and 21. This moves the lug 104 away from the spring bolt 105 to unlock the block. At the same time, rack 96*a* engages pinion 107 and rotates the nut 93 to bring the roller 100 under the edge of the block side plate 16, as shown in Figure 18. At the same time rack 97 turns the pinion 101*c* and rotates the disc 101 so that it moves out from under the side plate 16 of the block. The block is now unlocked and is supported by the four rollers 100 at its four corners rather than by the four discs 101. The worms 92, 93, 94 and 95 are now rotated in a counterclockwise direction as worm 93 appears in Figure 19. Since the pinions 107 are engaged with racks 96*a* and cannot rotate, the nuts 99 on each of the four worms are driven downwardly, carrying the blocks downwardly with them. As each pinion 107 moves downwardly out of engagement with its associated rack 96*a*, one of the teeth of the pinion moves into a fixed vertically extending slot 108 (Fig. 18), which maintains the nut 99 against rotation during its downward travel. The slot 108 extends downward to a point adjacent the next lower rack bar 96. As the pinion 107 moves out of the lower end of the slot 108, it engages that rack bar.

When the pinions 107 engage the lower rack bars, the rotation of the worms is stopped and the shaft 102 is then driven in a clockwise direction as viewed in Figure 21 to drive the rack bars 96 to the left as viewed in Figure 18. This rotates the discs 101 to bring them under the side plates 16 of the blocks, and turns the nuts 99 to bring the rollers 100 out from under the blocks. Also, the lugs 104 engage the spring bolts 105 to lock the blocks in their new positions. As soon as the blocks are locked, the worms are rotated in a reverse direction, driving the nuts 99 upwardly until they are returned to their original positions. During this upward movement the rollers 100 do not carry the blocks, since the rollers 100 are then in the angular position shown in Figure 19.

The full sequence of the operations, both hand and automatic, of an individual indexing station, may now be described as follows:

The operator, after the visual identification of an envelope address and after actuating the code selector switch (that may be of a type disclosed in French patent application lodged on January 16, 1946 by Centre d'Etudes MBA for "Apparatus for indexing and/or sorting documents or articles" corresponding to U. S. application Ser. No. 722,197, previously mentioned), records the envelope by pressing on the handle 72. At this moment the envelope is drawn into a receptacle and is stamped on its way as disclosed in my copending application Ser. No. 765,946.

The envelope takes its position in a previously decoded receptacle at the same time as a fresh code is assigned to this loaded receptacle.

The loaded receptacle moves from the waiting-chamber 58 to waiting-chamber 67 (Fig. 13) and is then delivered by the ram 66 into station 49.

When a set of receptacles has been brought into the chamber 49, the push button 50 comes into action and starts the delivery mechanism 48, shown in Fig. 11.

The empty block that is in the waiting position 29 is then loaded and thereafter moved down automatically to the lower position 32 through the movement initiated by the withdrawal of the member 48 to its starting position (Fig. 11).

In this same operation, the empty receptacles that were contained in the block standing in position 28 are withdrawn and brought into the storage space 56, of the indexing cabinet. At the end of the return travel of the bridge 47 and the parts moving with it, the receptacles in the space 56 are thus released from the extractors 46 through the control 63, Fig. 17, that starts up the box of combinations 87. The worms 92 to 95 are actuated in the proper direction and then cause the downward motion at the same time of all the carrying nuts 99, of which the rollers 100 support at this juncture the blocks that are in position at 31, 28 and 29.

This operation can be done since the block, loaded with receptacles, that was standing at position 32 has been released by the drawing mechanism shown in Fig. 12, during the time required for full loading of the chamber 49 with coded receptacles each containing an envelope.

The station 31 is thus released for the insertion of a block through the mechanism shown in the upper portion of Fig. 12 and allows the entry of a fresh block coming from the distributor-collector 3.

These operations, with the exception of the entry of a block of empty receptacles and the withdrawal of a block of full receptacles from or to the distributor-collector are governed and fixed to the operator's own working rate.

After the lowering of the blocks, the shafts 102 are set turning at the suitable moment, so that the discs 101, at the end of the movement, take the place of the rollers 100 for carrying the blocks and thus release the nuts 99 that go up right away into a free position at 90° from the previous position.

These automatic movement controls are governed likewise by the working speed of the operator.

The block loaded with coded receptacles that has been withdrawn from the frame is drawn on to the collector 3, if the plant is set up according to the layouts of Figs. 1 and 2, and is taken from the collector 3 by the rising conveyor 4. The rising speed of this conveyor is set in proportion to the maximum number of individual indexing stations that may be in service round the distributor-collector.

This block is brought then either into a preclassifying cabinet 5, or directly to a distributing and classifying cabinet. The insertion of a pre-classification into the system only takes place in the case where the number of destinations is such that an excessive amount of space would be required for each distributing and classifying cabinet. In such a case the pre-classifying cabinet has to ensure a distribution beforehand of the envelopes to a certain number of sets of distributing cabinets assigned to various destinations.

All the blocks coming to a pre-classifying cabinet enter this cabinet at a mechanical rate of feed tallying with that of all the indexing stations when they are working at top speed. In this cabinet, the blocks loaded with receptacles are drawn to extraction stations and there emptied. The receptacles are distributed to the various reloading stations in groups arranged according to their places of delivery. The empty blocks also pass to the reloading stations, where they are loaded with receptacles having a common group classification.

The requisite operations and mechanisms therefor are provided for in this cabinet so that, in spite of a mechanical feeding at a fixed rate of speed, the distribution of the blocks to the intermediate stations, then to the reloading stations may be carried out automatically, irrespective of the lack of symmetry of flow of receptacles into the various reloading stations of the cabinet.

In the example of a pre-classifying cabinet that will now be disclosed with reference to Figs. 23 to 43, a pre-classification in four groups will be assumed.

A block loaded with receptacles and carried by the rising conveyor 4 of Fig. 1 enters the pre-classifying cabinet 5 at an unloading station 111. At this unloading station, the receptacles coded for a first of the four groups are unloaded from one side of the block, and the receptacles coded for a second of the four groups are unloaded from the opposite side. The block then moves on to unloading station 112 where the receptacles coded for the third and fourth groups are unloaded respectively on the opposite sides. The block is then completely empty and passes upwardly to station 110 and then moves longitudinally to station 113, from which it may move to either side into position 114 or 115 and, from one of these stations to the following stations 116 and 117. After this the block of the station 116, for instance, will be drawn either to station 118 or station 119 depending upon whether there is a block standing at station 119.

The standing of a block at station 119 is regulated by the presence of a block awaiting loading at station 120.

The presence of a block at station 119 is in the same way dependent on the presence of a block awaiting loading at station 121. Station 121 through this mechanism always has priority of feeding in blocks over station 120. This is necessary because the receptacles withdrawn in the first group and shown at 122 will reach their delivery station 123 before the receptacles withdrawn at the third group at 124 reach their delivery station 125. These arrangements have their counterpart for the groups served by the other half of the cabinet.

The movements of the blocks must be regulated so that with a feed that varies at each unloading station, full loadings of receptacles will be met again by empty blocks at each exit station of the cabinet.

The operation, in fact, depends chiefly on the distribution of the receptacles according to sectors. This distribution may take place, either in a substantially uniform manner, or else in an unforeseeable way that may be assumed say to be quite unsymmetrical, the distribution being governed by the destinations of mail posted by the general public, in the case of post office sorting. The loading of the blocks at any of the four loading stations has been provided so that it may be carried out at the top speed of the conveyor or at a multiple of that working rate.

Provision is made consequently for the automatic working of this cabinet so as to allow for a sharp and complete lack of symmetry at one of the stations prejudicial to the others without any resulting change in the working rhythm and without any danger of causing a stoppage in the circuits of the blocks and receptacles.

At the commencement of sorting the cabinet has always a reserve supply of empty blocks in circuit. This reserve supply may consist, for instance, of eight blocks located at the stations 118, 119, 120 and 121 on opposite sides of the block and arranged symmetrically.

The receptacles withdrawn at the stations 111 and 112 will be respectively directed to the reloading stations 123 and 125. But the rearrangement into blocks will be made in a block already standing at this station, any surplus of receptacles being held back in a waiting stock and delivered to the next empty block.

A separate explanation will now be given of the various handlings carried out: handling of the empty blocks on the one hand, rearrangement in groups of the receptacles on the other hand, and reloading of these receptacles into blocks.

When an empty block has reached the station 110, a mechanism, of which an example is illustrated in Figs. 24 and 25, runs on the latter from station 110 to station 113. This mechanism is formed by a belt 126, that moves at regular intervals, provided with brackets such as 127 and 128 which may take hold of a block at the station 110 by one of its cross braces 18. At the end of a travel slightly greater than the length of a block, the bracket 127 (or alternately 128) is released automatically from the cross brace 18.

Apparatus for the selective disposition of the blocks moving from station 113 is illustrated in Figures 24 to 27. This apparatus includes two parallel worms 132 which extend transversely across the stations 113, 114 and 115. On each worm move three nuts 129, 130 and 131, each having a downwardly and laterally extending finger 133 and respectively having driving heads 137A, 137B and 137C. These nuts are rotatable individually between two angular settings with respect to the worms 132. In the driving setting, shown in Figs. 24 and 25 and in full lines in Figure 27, the driving heads project upwardly so as to engage a block. In the retracted setting, shown in dotted lines in Figure 27, the driving head is lowered so that it will not engage a block. The angular setting of any of these nuts depends upon whether its finger 133 is engaged in a groove 134 or a groove 136 of one of a pair of guides generally indicated at 135 and arranged below and parallel to the worms 132. Each guide 135 is also provided with a laterally extending flange 143 on its upper edge, to receive the casters 26 of the blocks.

The nuts 129, 130 and 131 are shown in their starting positions in Figs. 24 and 25, at the right hand end of their respective travels. In each cycle of operation, the worms 132 are driven first in a direction so as to drive the nuts 129, 130 and 131 to the left end of their respective travels, or slightly more than the width of one station. The worms then move in the opposite direction until the nuts return to the right hand ends of their travels, whereupon a dwell takes place, with the worms remaining stationary. During this dwell, the belt 126 runs to move another block into location 113.

The driving heads 137A and 137C are provided with spring hinges, so that they normally assume the positions shown in Figures 24 and 25 when in their driving settings, and are contoured so that they may be pushed downwardly by any block encountered as they move toward the center station 113, even though the heads may be in the angular setting for driving.

The heads 137B may drive a block from position 113 to either position 114 or position 115. The head 137A may drive a block only from position 115 to position 117, and the head 137C may drive a block only from position 114 to position 116.

The angular settings of the heads 137C are controlled in accordance with the occupancy of station 116 by a framework including two rods 138A and 138A' attached to a rod 141A, which is operated through a suitable mechanical linkage by a lever 140A. When the station 116 is unoccupied, the lever 140A assumes the position shown in Figure 24, being biased to that position by a suitable spring (not shown). The rods 138A and 138A' then have the positions shown in Figure 29B and in Figure 27. Each finger 133 is provided with a pin 133A near its tip, which is adapted to engage a slot 133B in the rod 138'A. With rod 138A' in the position of Fig. 27, the slot 133B holds the pin 133A so that finger 133 is aligned with groove 134, and head 137C is in its driving setting. In that setting, the heads 137C are effective as they move to the left to engage any block resting in station 114 and drive it to station 116.

Figure 29A:
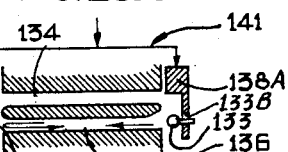
Figs. 29A and 29B illustrate diagrammatically two positions of other parts of the block selector mechanism.

When a block moves into position 116, it engages lever 140A, rotating it in a counter-clockwise direction as viewed in Figure 24 and thereby driving the rods 138A and 138A' to the right as they appear in Figure 24, so that they take up the position shown in Figure 29A, wherein the slot 133B is aligned with the groove 136. This shifting of the rods 138A and 138A' takes place as the block reaches the end of its travel into the space 116, so that the pin 133 is then at the left hand limit of its travel as it appears in Figures 29A and 29B. At the left end of travel of pin 133, it is received in a notch 133C in the adjacent rod 138A and therefore moves with the notch to the position shown in Figure 29A. This turns the head 137C to its retracted setting. When the pin 133 next moves to the right, it moves through slot 136 and the head 137C is maintained in its retracted position, where it remains as long as position 116 is occupied. When the station 116 becomes unoccupied again, the rods 138A and 138A' return to the positions shown in Figure 29B, thereby returning the pin 133 to a position in alignment with groove 134, and restoring head 137C to its driving position.

The shifting of pin 133 between grooves 134 and 136 takes place only at the ends of the pin travel. The change of station 116 from unoccupied to occupied condition always takes place at the left end of the travel of the heads 137C, nuts 131 and their pins 133. The change of station 116 from occupied to unoccupied condition may take place only during the dwell at the right end of the travel of nuts 131. It is necessary that this change take place during a dwell, since the finger 133 would not be shifted to groove 134 if the change took place during travel of the nut 131. This coordination may be ensured by driving the mechanism which lowers the blocks from station 116, to be described hereinafter, only during the dwell periods of the worms 132.

The angular settings of the heads 137A on nuts 129 are controlled in accordance with the occupancy of station 117 through the agency of a lever 140D, a rod 141D and connected rods 138D and 138D'. The control is similar to that described above in detail for the control of the angular settings of the heads of nuts 131 in accordance with the occupancy of station 116.

When the nuts 130 are at the right hand side of station 113, as they appear in Figures 24 and 25, the angular settings of their heads 137B are determined by the occupancy of station 114, through the agency of a lever 140B and a rod 141B mechanically connected thereto. When the nuts 130 are at the left of position 113, the angular settings of their heads 137B are determined by the occupancy of station 115 through the agency of a lever 140C which is mechanically connected to a rod 141C.

The angular settings of the heads 137B are reset at the beginning of each horizontal stroke in accordance with the occupancy or non-occupancy of the particular one of stations 114 and 115 toward which it is moving. When heads 137B are moving toward the left, they are set in the driving position if station 114 is vacant, so as to drive any block which may be at station 113 into station 114. If station 114 is occupied, the heads 137B are retracted when moving toward the left. Similarly, heads 137B when moving toward the right have their angular settings determined by the condition of occupancy of station 115.

The rod 141B is formed with a slot 141E (Figs. 28A to 28D) to receive the pin 133A on the finger 133 attached to nut 130. A leaf spring 141F overlies a portion of this slot 141E, on the side of rod 141B toward the guide 135. A portion of the rod 141B is recessed under the spring 141F so as to permit the spring to deflect toward the rod.

The rod 141C is provided at its end with a recess 141G which at times receives the finger 133. Another recess 141H is provided in rod 141C, spaced from the recess 141G by a distance equal to the spacing between the grooves 134 and 136. A leaf spring 142 is attached to the lower edge of the groove 136 at its left hand end, as it appears in Figures 28A to 28D.

As previously mentioned, after each new block moves into the station 113, the nuts 129, 130 and 131 are started from the positions shown in Figure 25 toward the left. If stations 114 and 115 are then both occupied, the rods 141B and 141H are in the positions shown in Figure 28A. Under those conditions, the finger 133 moves through slot 136 and the driving head 137B is held in its retracted position. The finger 133 remains in the slot 136 during its travel to the left and stays there during its subsequent travel to the right, so that the block is not moved away from station 113.

Figure 28A:
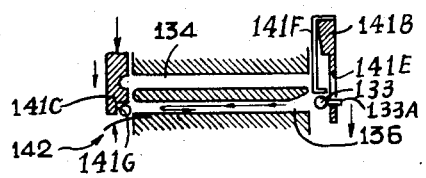
Figs. 28A to 28D illustrate diagrammatically various positions of certain parts of a block selector mechanism which cooperates with the guide of Figs. 26 and 27.
Figure 28B:
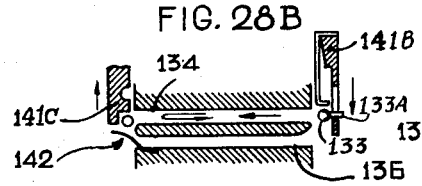

If both stations 114 and 115 are vacant when the nuts start a cycle of operation, then the rods 141B and 141C have the positions shown in Figure 28B. Under these conditions, the finger 133 is guided into groove 134 and the driving heads 137B remain in their driving positions, carrying the block from station 113 into station 114. The finger 133 remains in groove 134 during the reverse travel but since station 113 is vacant, no block is then moved into station 115.

Figure 28C:
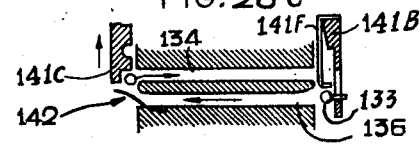
Figure 29B:
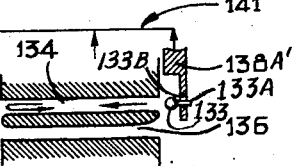

The occupation of station 114 by the block causes rod 141B to move downwardly to the position shown in Figure 28C. Consequently when the finger 133 reaches the right end of its return travel, it engages the leaf spring 141F which forces the finger 133 downward to the position shown in Figure 28C, where it is aligned with groove 136. A new block is now moved into station 113 while the finger 133 dwells at the position shown in Figure 28C. When the nuts start their next movement to the left, finger 133 moves through groove 136, holding the head 137B in its retracted position. When the finger 133 reaches the left end of its travel, it engages the leaf spring 142 which moves it upwardly into a position aligned with groove 134, hereby moving the head 137B to its driving position. As the nuts return toward the right, the heads 137B engage the block at station 113 and drive it into station 115.

Figure 28D:
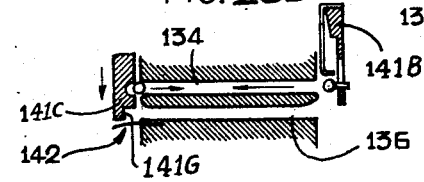

When station 114 is unoccupied and station 115 is occupied, then the rods 141B and 141C have the positions shown in Figure 28D. The operation is then the same as described above in connection with Figure 28D, wherein both stations 114 and 115 were unoccupied.

It may be seen from the foregoing that this mechanism gives a preference to station 114, in that if both stations 114 and 115 are unoccupied, the next axailable block is moved into station 114.

Figure 30:
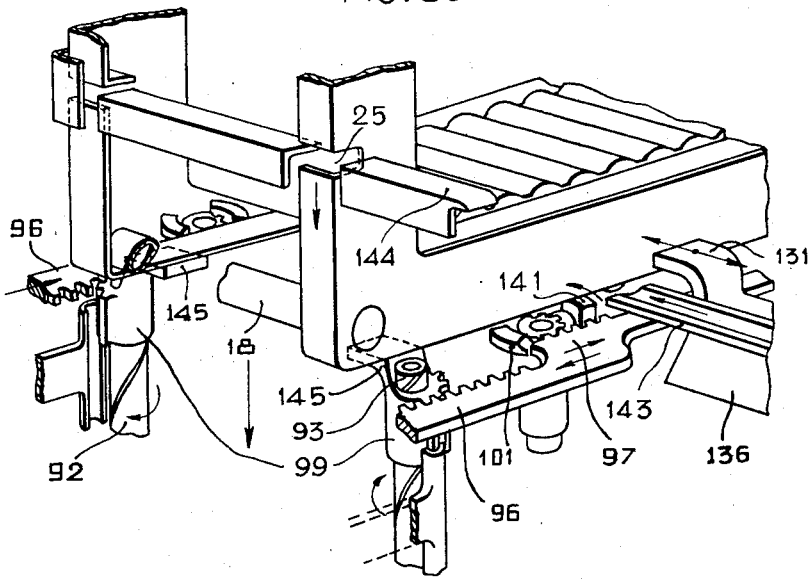
Fig. 30 is a perspective view of the mechanism in a pre-classifying cabinet for shifting a block between an endwise horizontal movement and a vertical movement.
Figure 26:
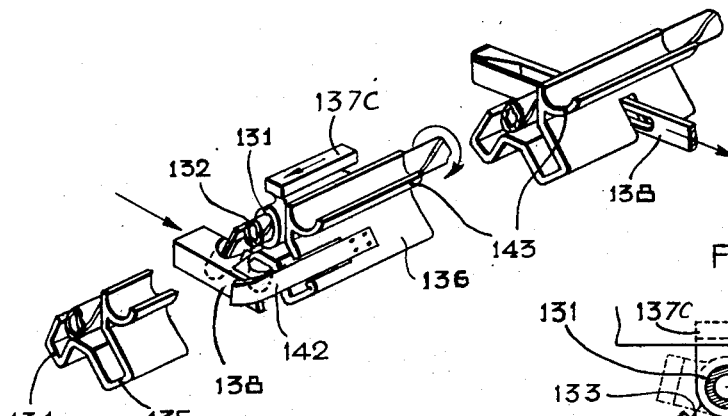
Figure 27:
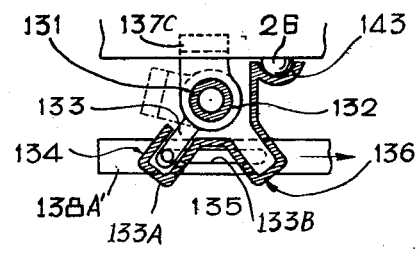
Fig. 27 shows in section an enlarged detail.

In the transfer of a block, for instance from position 114 to position 116, the block leaves the rail track 143 (Fig. 30) to be supported in a suitable position by angle irons 144 on which are engaged the slots 25 of the cheeks of the block, Fig. 30.

In the position 116, the block is released from the angle irons 144 and rests on discs 101 forming part of a mechanism similar to that illustrated in Fig. 18, of which the corresponding elements have been denoted by the same reference numbers in Figs. 30 and 33 (the latter showing diagrammatically the left half of the mechanisms of the cabinet).

The nuts or screw collars 99, moreover, are provided of such a shape that they offer a bearing surface 145 higher than the end of the worms 92—95 when stopped at the position shown in Fig. 30. This construction allows the blocks to pass over the ends of the worms by translational movement.

The notches of the angle bars 144 then allow the free downward motion of the block to the lower stations.

The downward travel of the empty block, for instance from station 116 to the lower stations 118 and 119, which are the waiting stations for the loading stations 120 and 121, is regulated by the presence or absence of blocks at those lower stations, through the agency of the mechanisms shown in Figs. 30 to 32.

Three cases may occur:

In the first, the station 118 is free and station 119 is occupied.

The nuts or screw-collars 99 are shown in Fig. 33 in their active position, that is to say they are carriers, and turned inwards under the block that is thus held in position. The nuts 99 lower the block from 116 to 118. With the station 119 engaged the corresponding nuts are in the negative position, that is to say turned outwards and away from the block and they will not take part in the movement that will be now described and the block standing at 118 remains in the waiting position.

On the movement of the block to position 118, the lower portion of this block engages a pair of rollers 146 and pushes them apart, thereby rotating arms 147 which support the rollers. The arms 147 are operatively connected to supports 148. Upon such movement of arms 147, supports 148 are moved in under station 116 to prevent the lowering of another block therefrom.

With station 119 engaged, the block that has come down from station 118 will rest at first on the bearing surface 145 on which it moved down then these bearings will recede and be rotated outwardly to allow the nuts 99 to come up again and the block will then rest on supports 148 controlled by the occupancy of station 119. This is illustrated in Figs. 31 and 32.

It will be noted that the block standing at 118 may go easily to station 120 owing to the grooves 139 in the cross supports 148 locked by the occupancy of station 119. This horizontal movement may be controlled, for instance, by the mechanism shown in Figs. 34, 35 and 36, that is described hereinafter.

The locking of the supports 148 is only terminated when the movement of the block from station 119 to the station 121 is completed.

Let us consider now the second possible case, where the stations 118 and 120 are occupied, and the block in station 119 moves to the station 121. In the following cycle of operation of the lowering mechanism for the blocks, the block that is standing at 118 will be lowered to the station 119 when the supports 148 open out.

This operation takes place even if the station 120 has become free, for the condition of entry to station 120 will not be completely satisfied on account of a locking of the drawing mechanism from the station 119.

In the third possible case, where the stations 118 and 119 are both free, which is a rare case since the cabinet always keeps a reserve supply of blocks waiting, the block that comes from the station 116 will be lowered in two stages successively to station 118 then to station 119. In fact the travel of the nuts 99, as may be seen in Fig. 33 is only the distance between two stages.

The run of the empty blocks from stations 118, 119 to stations 120, 121 is provided so as to be carried out in a horizontal plane along the major length of the block.

It may only be carried out as pointed out previously under the following conditions:

1. The loading station 120 or 121 under discussion is free.

2. The station 119 has to be engaged in order that a movement of a block may be carried out from station 118 to 120 for the station 121 and its counterpart are the first stations supplied with receptacles.

If such a preference for station 121 were not provided, then in the case of a symmetrical distribution, or substantially so, of the receptacles to the four sectors of the cabinet, the station 121 and its counterpart would run the risk of only receiving blocks with a lot of delay, that is to say, after saturation of the station 120 and its counterpart, which would attract the blocks appearing at the stations 118 and their counterpart.

Now station 120 receives the receptacles from the second withdrawal station 112 with a certain amount of lag with reference to the receptacles that are withdrawn at the first withdrawal station 111.

It therefore becomes requisite to provide a stock of empty blocks with priority at the loading station 121 and its counterpart, so as not to overload the waiting chambers for receptacles located between the withdrawal station 111 and reloading station 121.

The translational movement of a block from the station 118 or 119 to 120 or 121 takes place automatically during the ascending cycle of the carrier nuts 99, Figs. 31 and 33.

Figure 36:
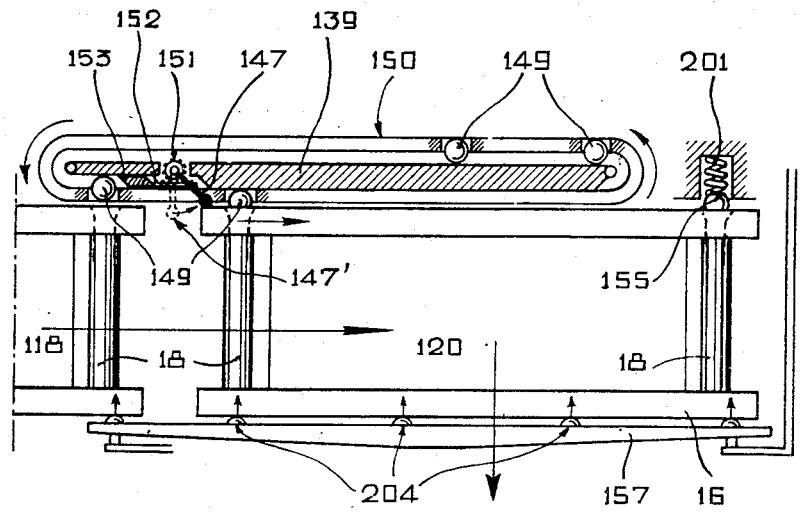
Fig. 36 shows, partly in plan and partly in section, the driving assembly for the horizontal translational movement of a block.

The mechanism for driving a block from station 118 or 119 to station 120 or 121 is shown in Figs. 34 to 36, and includes four balls 149 located in housings 154 distributed over the periphery of a driving belt 150 of which the forward movement is carried out in two strokes with a stoppage time of indefinite length between each movement depending on the flow of receptacles to the corresponding loading station. The starting in motion of the belt may take place only during the ascent of the nuts 99 mentioned above.

At each forward movement, the translational travel of the belt 150 amounts to the distance between the axes of the cross-pieces 18 of a block plus the structural distance between the two stations, for instance 118 and 120.

Each ball 149 may project from its housing 154 without being able to get out of it. These housings are distributed over the belt in two couples, spaced by the distance between stations, each ball of a pair being separated from the other by a distance equal to the length of a block between the axes of the cross-pieces 18.

The balls 149 act as drawing fingers when they are engaged with the cross-pieces of a block then projecting out of their housings 154. This engagement is controlled by the movement of the rack 152 through pinion 151, itself actuated by the lever 147. When this lever is in the position shown in full lines in Fig. 34, the rack 152 is retracted and if a ball carried by the belt 150 passes in front of it, this ball will remain in its housing 154 and the block will not be drawn. When this lever is in the position shown in dotted lines in Figs. 34 and 36, the slope 153 of the rack compels the ball to project from its housing 154, and therefore engages it with the cross-piece 18 of the block. With the ball then rolling against the frame 139, the ball will remain forced into the cross-pieces and will draw the block.

The active or passive position of this lever 147 is controlled by the absence or presence of a block standing at station 121 (or 120) or its counterpart. In addition, if the station 119 is free, then even if the station 120 is free, the absence of blocks at the station 119 will lock the lever 147 associated with station 118 in its passive position. This linkup moreover is not shown so as not to confuse the drawing.

When the block has reached its right position at the station 120 (or 121 or symmetrical stations), it is locked in this position, for instance by a ball 155, Fig. 36, forced into a cross-piece of the block by a spring 201. This exactitude in positioning will make it easier to bring into this block a set of receptacles.

On the other hand, a ball of the second pair has been brought into a waiting position for the engagement of a fresh block, but with the lever 147 returned to a passive position, this ball cannot act for the untimely drawing of a block during the periodic movement of the belt 150.

During the horizontal translational movement of the block the casters 26 are steered by the grooves or rails 202 of the frame, these grooves being terminated as shown in Fig. 35A by switches 203 for a subsequent movement of a block perpendicular to its length. In addition, the reaction of the driving balls is counterbalanced by the bearing of the cheek 16 of the block against balls 204 housed in guide strips such as 157. The wall of the frame straight below these guide strips is hollowed out to form a groove 205, Fig. 35, in order to allow the receding movement therein of the guide strips at the time of loading receptacles into the block and discharging said block to the conveyor that connects the pre-classifying cabinet with the distributing cabinet assigned to the destination corresponding to the pre-classifying stage under discussion.

Figure 23:
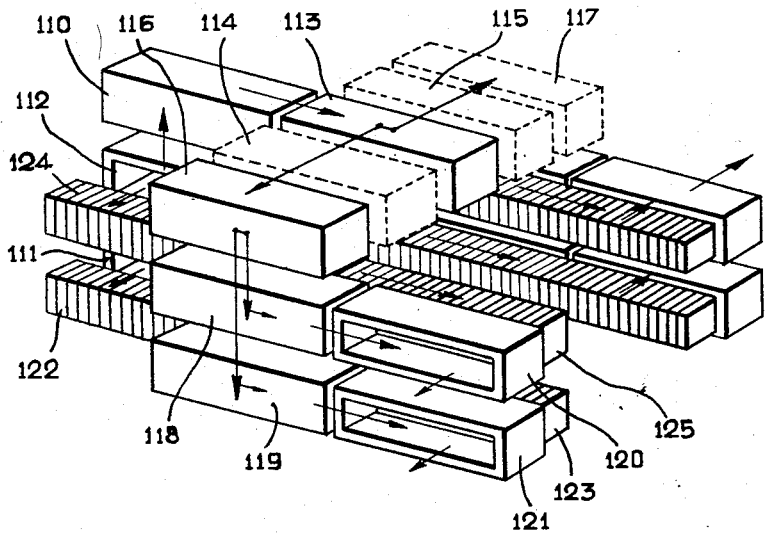
Fig. 23 is a perspective diagram showing the movement of the blocks and receptacles in a pre-classifying cabinet.

Extraction stations 111, 112 and symmetrical stations, Fig. 23, where the receptacles are removed from blocks coming into the pre-classifying cabinet, form the starting points of the conveyors which carry the receptacles to the reloading stations 121 and 120.

Figure 37:
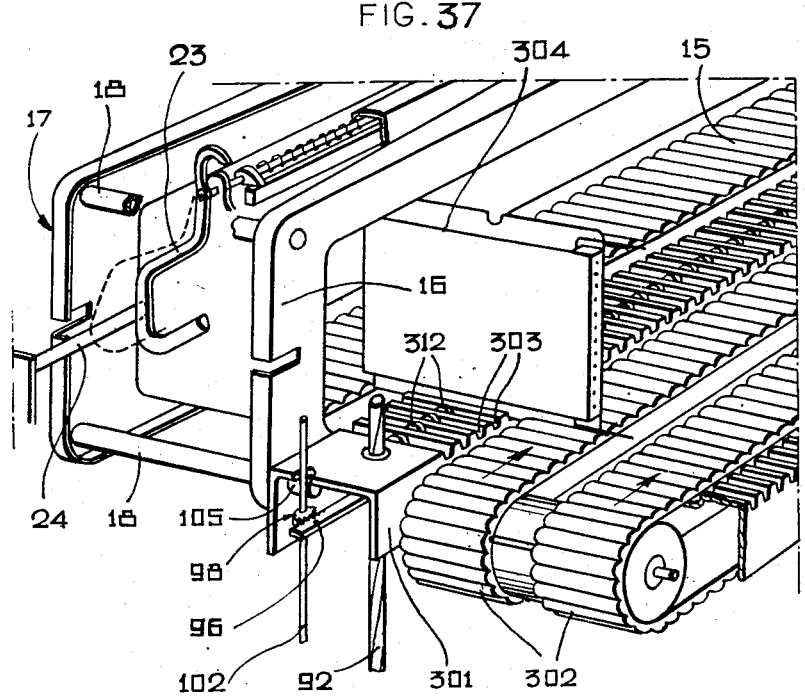
Fig. 37 is a fragmentary view in perspective, of a receptacle extracting station, the extracting mechanisms not appearing.

Fig. 37 gives a part perspective view of one extraction station of the cabinet; a block is shown there standing and locked at the precise extracting position in relation to the frame of the cabinet by means similar to that already pointed out in Fig. 21, which locking means includes a spring bolt 105.

The piece 23 is in the position for unlocking the receptacles, being engaged by the fixed rod 24, that is integral with the frame.

This frame is provided with an intermediary angle iron 301 between the stopping position of the block and the conveyor belt 302, in order to ensure the correct guidance of the identified receptacles withdrawn from the block at this stage so as to bring them to the driving belt.

This angle iron has transverse grooves 303 provided in such a way that they correspond exactly with the pitch of the grooves of the inner wall 15 of the block standing at this station and of the corrugations of the belt 302 from the extractor.

As an example, a receptacle 304 has been shown during its removal. It will be observed that the lower portion of the receptacle is guided in a continuous way from one groove of the inner wall 15 through a groove 303 of the angle iron 301 and to a corresponding groove or corrugation of the belt 302. If the latter is not in exact register when stopped with a groove of the angle iron 301, the whole of the withdrawn receptacles would have the tendency to automatically correct any slight irregularities in position that might arise from the belt 302.

In Fig. 37, there are shown at 312 mechanisms that, according to my copending application Serial No. 765,946, previously mentioned, control the closing of the extractors on the identified receptacles.

The belt 302 and its upper counterpart 305 (Fig. 38), of which the control mechanisms have been described with reference to the extraction of the receptacles in said copending application Serial No. 765,946 (the extractor has been shown at 306 in its withdrawn position) are reproduced on the left portion of Fig. 38 which gives a perspective view of the whole of the path travelled over by receptacles in the cabinet from the driving belt of an extraction station to a station for reloading receptacles into a block.

A regulating waiting chamber is provided between these two stations. Fig. 39 shows, in plan view, receptacles 304 removed from a block by the mechanism 306 under the control of worms 311 as disclosed previously in the copending specification.

At the end of the travel of the extractor 306, the removed receptacles 304 are transferred by the belts 302 and 305 towards the regulating waiting chamber where they are picked up by the belts 312 and 313.

The travel of the belts 302 and 305 is equal to the inner length of a block plus a length equal to that of a bridge formed by the upper and lower members 315 and 314. The member 314 is slotted cross-wise to allow the free movement of the extractor 306. A plate 316 is inserted in the slot through the lower bridge member 314 and moves with the extractor 306, so as to ensure the unbroken continuity of the surface of this bridge member after the withdrawal of the extractor.

A mechanism shown generally at 317 in Figs. 38 and 39 pushes the receptacles across the bridge members 314 and 315 into engagement with the belts 312 and 313. This mechanism will be described in detail in connection with Fig. 40. The receptacles withdrawn by the extractor 306 rest singly or in random groups on the belt 302, as shown at 304 in Figure 39. After the extractor has reached the outer end of its travel, that is, its lower end as it appears in Figure 39, the belt 302 starts up to move the withdrawn receptacles along towards the reloading station. As each receptacle reaches the position indicated at 322 in Figure 40, it moves on to the stationary bridge member 314. This bridge member is provided with a number of flexible guide elements 324 which maintain the receptacles upright as they move across it. As each receptacle moves on to the bridge member 314, it ceases to be positively driven until the next succeeding receptacle comes up behind it and pushes it over the flexible guide elements 324. Consequently, the somewhat scattered arrangement of the receptacles on the belt 320 is changed into a compact arrangement as they are transferred to the bridge member 314.

Mechanism is provided for pushing the compacted group of receptacles on the bridge member 314 on to the belt 313, as soon as the last receptacle of a group withdrawn from one block reaches the bridge member 314. This mechanism is best shown in Figure 40 and includes a number of cross bars 319 carried by the belt 302. The belt 302 is always stopped with a cross bar 319 located some distance behind the last receptacle which may be moved onto the belt from the adjacent block. At each side of the belt 302, near its exit end, there is provided a pusher 320 having a horizontally extending flexible finger with a raised tip 321 adapted to engage the lower edge of a receptacle and a tail piece adapted to be engaged by a cross bar 19. The pusher 320 is attached by a piston rod 331 to a piston 330 moving in a cylinder 328. A spring 327 biases the piston 330 toward the left end of the cylinder as it appears in Figure 40 and thereby biases the pusher 320 to the position shown in full lines in Figure 40.

As the receptacles pass the pushers 320 and their raised fingers 321, the fingers 321 are pushed downwardly by the receptacles, such downward motion being permitted by the flexibility of the fingers and the contour of the right end of pushers 320. After the last receptacle of a group reaches the position of receptacle 322 in Figure 40, then as the belt 302 continues to move, the cross bar 319 engages the tail pieces of the pushers 320 and moves them to the right against the action of springs 327, toward the dotted line position shown in Figure 40. At this time, the fingers 321 engage the lower edge of the last receptacle on the bridge 314 and push all the receptacles assembled on the bridge across it and on to the belt 313. When the pushers 320 reach the dotted line position shown in Figure 40, the cross bar 319 reaches the end of its horizontal travel and starts moving downwardly as the belt 302 passes around its pulley. The cross bar 319 thereby moves out of engagement with the back end of the pushers 320, which is thereupon retracted to its normal position by the return spring 327.

The cylinders 328 are provided with suitable vents 329 and 326. The pistons 330 and cylinders 328 serve as dash-pots to retard the return stroke of the pushers 329.

From the storage chamber constituted by belts 312 and 313, the receptacles are brought across bridge members 310 to the reloading station between the belts 158 and 159. The upper bridge members 310 are slotted for the passage of the supports of the ram 163. The crossing of these bridges by the receptacles is carried out by the pressure of the receptacles that have been rearranged in the waiting chamber. The belts 158 and 159 of the stations 123, 125 and symmetrical stations of Fig. 23 are also moved by forces transmitted through the receptacles that are delivered there.

When a complete set of receptacles has been brought into this reloading station the receptacle at the end bears (Fig. 41) in the lower station against an abutment 179 and forces it back against the action of a spring 160. Through a lever 161, this abutment 179 operates suitable control mechanism to start the worms 162.

The control mechanisms described for the reloading of the blocks at stations 120, 121 and the symmetrical ones work independently. This is shown in Fig. 41, in which the upper station is in process of being filled with receptacles while the lower station has received a complete set of receptacles, and also in Fig. 42, in which the block in station 120 is waiting to be locked while the lower station 121 is delivering a reloaded block on to the handling chain that leads it to a corresponding distributing cabinet.

Fig. 43 shows a perspective view of a complete station for reloading a set of pre-classified receptacles 304 into a waiting block 14. On each side of the ram 163, cross-pieces 164 move in slots 171 of bars carrying at their ends racks 165. The ram 163 brings the set of receptacles 304 into the block 14 that cannot move sideways since it is held by the guide bars 157. When the receptacles 304 have been loaded into the block, the cross-pieces 164 actuate the racks 165 that, through bevel gears 166 and pinions 167, cause the withdrawal of the guide bars 157. The block now loaded is no longer held and the travel of the ram being extended the locking bar 19 for the receptacles in the block is lowered through the cooperation of the stops 24 and arms 23. The block and the receptacles are thus made rigid with one another and subsequently the ram drives the loaded block over the rails 168 on to the conveyor belt 169 where it is caught by the hooks 170 so as to be conveyed to the distributing cabinet corresponding to the sector of destination for which the receptacles that it contains have been pre-classified.

The block comes into this distributing cabinet through the lower stage 300, Fig. 1, and is drawn up by the rising conveyor 8 which may either be of the type including worms and carrier nuts as disclosed hereinabove or of the elevator belt type as set out in my copending application Ser. No. 765,946.

At each extraction station of the distributing cabinet, the receptacles extracted at one side follow the line of travel shown in Fig. 44 in perspective and in Fig. 45 in plan view. Portions of these figures similar to those of Figs. 38 and 39 described with reference to the pre-classification cabinet will not be again described in detail here, the corresponding parts being denoted by the same reference numbers.

The waiting chamber formed by belts 312 and 313 is followed, in the distributing cabinet, by a station 308 for the opening and loading of a predetermined number of receptacles, then a station 309 for reclosing empty receptacles, after which the receptacles are brought to a re-routing station 307. The receptacles are carried through stations 308, 309 and 307 by belts 239 and 240. These belts move intermittently in steps equal to the total thickness of the number of receptacles that have to be opened simultaneously then reclosed.

At the station 308, the receptacles are opened in parallel either by a mechanism described in my copending application Serial No. 765,946, or by the mechanism to be disclosed with reference to Fig. 46.

In Figure 46, there is shown a receptacle having a plurality of code index members 333, one of which is in register with a feeler 334 housed in an identification mechanism 335. The identification mechanism 335 may have more than one feeler 334, all of which must register with cooperating index members in the receptacle to be unloaded in order for the unloading mechanism to operate. The identifying mechanism 335 includes a bar 336 carrying a plurality of pins 336a cooperating with notches 334a in the various feelers. If any feeler 334 is not in mating engagement with the opposite index number 333, then that feeler is pushed back so that it does not have its notch 334a aligned with the associated pin 336a so that the bar 336 is held in a position displaced upwardly from that shown in the drawing. When all the pins 336a are aligned with notches 334a or else are not associated with a feeler, then the bar 336 may move downwardly to the position shown in the drawing, under the influence of a spring blade 336b. This downward movement of the bar 336 allows a shank 337 formed on a rack guide 338 to move into a notch at the upper end of the rod. A rack 339 carried by the guide 338 is thereby moved into engagement with a pinion 340.

The pinion 340 is intermittently driven in opposite directions, as described in my copending application Serial No. 765,946. It is coordinated with the forward movement of the conveyor belts so that when the latter are stopped with receptacles under the various racks 339, the racks will be moved downward to engage the opening bars 343 in the receptacles, thus releasing the envelopes.

The movement of the rack guide 338 is transmitted through a mechanism generally indicated at 341 to a similar rack guide on the other side of the receptacle. A return spring 342 insures that all the parts will return to their original positions. When the pinion 340 rotates in a clockwise direction, it lifts the rack bar 339 out of the receptacle, so that all the receptacles are free to move when the movement of the conveyor belts is resumed. The receptacles remain open during a certain period of forward motion until they reach station 309 (Figs. 44 and 45), where they are closed.

The apparatus for closing the receptacles at station 309 is illustrated in Figure 47. This apparatus includes a rack bar 345 which pivotally carries a lever 348 having its lower end in the form of a hook 344. The rack is reciprocated vertically by a pinion 346 which may be keyed on the same driving shaft as the pinion 340 of Figure 46.

The parts are shown in the drawing in their inactive positions. The upper end of lever 348 is biased by a spring 351 against the surface of a slide 347. The rack bar is above the opening bar 343 of a receptacle, which opening bar is in its open position.

To close the receptacle, the pinion 346 rotates counter-clockwise, driving the rack bar 345 downwardly. During this downward movement, the upper end of lever 348 slides along the surface of a selector 347. When the hook 344 reaches a point opposite the flange on the upper end of opening bar 343, the upper end of lever 348 encounters a boss 349, which causes the lever 348 to rotate counter-clockwise against the spring 351 and thereby move the hook 344 under the flange 343.

The pinion 346 now reverses and drives the rack bar 348 upwardly. At this time, the upper end of the rack bar pushes the slide 347 up with it, so that it retains its angular position, with the hook 344 engaging the flange 343. The opening bar 343 is thereby moved upwardly to its closed position, whereupon the motion of the slide 347 is stopped by engagement of a projection 347a with a fixed abutment 347b. Further movement of the rack bar 345 upwardly causes the lever 348 to return to its normal angular position, whereupon the hook 344 is freed from the flange on the opening bar 343. The rack bar 345 continues to move upwardly until it and the hook 344 are free of the receptacle.

It is clear that mechanical modifications may be considered here again. The raising, especially, of the part 343 may be carried out through a flexible blade, housed in the frame and acting with a thrust at the single passage of the receptacle moving over it.

The receptacles thus unloaded and closed again are brought to the rerouting station 307, where their movement is subjected to a change in direction.

In fact, the rearranging of the receptacles at the upper tier of a distributing cabinet is provided to advantage according to the general layout of Fig. 48 of which some details are shown in Figs. 49 to 53. It will be seen that the receptacles in each tier are submitted in the first place to a movement towards the center of the cabinet, then a vertical routing as far as the upper tier and at that point, a partial collecting, after which, a general consolidation is carried out with a view to loading receptacles by sets into empty blocks. Figure 49 shows the details of the mechanism of one rerouting station 307. One such rerouting station is provided for each tier, and receives empty receptacles from two parallel sets of conveyor belts 239 and 240 (Figure 44). A drive shaft 401, which is common to all the tiers of the distributing cabinet, drives racks 353, 354 and 355 through suitable gearing including pinions 352. The racks 354 and 355 are respectively attached to plates 385 and 386, each of which receives receptacles from one set of the conveyor belts 239 and 240. The plates 385 and 386 are offset, and the racks 354 and 355 are alternately driven to move the receptacles to the center of the cabinet. When either plate is moving, the other plate remains stationary. The receptacles are held in the center of the cabinet during the return movement of the plate by the hooking of their lower notches over the yieldable raised edges 387 of the stationary opposite plate.

After the plate 385 or 386 is withdrawn, the receptacles are suspended over a platform 356 driven by the vertical rack 353. The rack 353 is then driven to move the platform 356 upwardly, carrying the receptacles upwardly until they engage the carrying lugs 388 on rising conveyor belts 357 and 358. These belts are actuated solely by the thrusting of the receptacles between them and, consequently execute an intermittent movement, that is a function of the extent of the extraction at this tier so as to draw the receptacles up to the upper tier of the cabinet (Figs. 50 and 51).

At this upper tier, the receptacles raised by belts 357 and 358 are moved horizontally by means of belts 362 and 363 which are driven by pinions with pawls 364 keyed on spindles 365, themselves actuated by rack rods 366 of which the intermittent motion is ensured from a common combination box (not shown).

After being moved off the belts 357 and 358, the receptacles are inserted endwise between grooved belts 373 and 374. This insertion is carried out by rams 367 driven by a shaft 361 through pinions 360 and racks 359, which shaft has a reciprocating movement of same period as the previous movements. These racks 359 actuate the rams so as to make the associated receptacles of one tier move between the belts 373 and 374. In this operation, the receptacles are directed by stop plates 368 (Fig. 48), and grooved plates 369 and 370 (Fig. 52). Fig. 52 shows, in transverse section, the layout of this operation. The proper translational movement of the receptacles is rendered easier by the grooved bridges 372 similar to the bridges 301 already described, that ensure the automatic alignment of the receptacles in the grooves of the belts 373–374 defining the general rearrangement chamber.

The movements of delivery of the receptacles and advance of the belts are synchronised so that each set of delivered receptacles may take up, in the general rearrangement chamber, a free space between two other sets of receptacles.

From this general rearrangement chamber, the receptacles go, through an adjusting waiting chamber 375 (Fig. 48), to a loading station defined by belts 376 and 389, the operation of which may advantageously be identical with that described for the loading stations of the individual indexing and pre-classification cabinets. The admission into the reloading station of a set of receptacles starts up, by engagement of the pusher 377, Fig. 48, the rotation of the worms 379 and 380 and therefore the action of the ram 378. The set of receptacles is thus brought into an empty block standing at position 381 (Fig. 53), the transfer being carried out through the agency of bridges 382.

The empty block standing at position 381 is a block that, having been brought in loaded with receptacles into the distributing cabinet has been unloaded successively by multiple extractions at each stage, according to the codes marked on the receptacles, and that at the stage before the last one has been emptied automatically, if necessary, of receptacles non-identified at previous stages: whatever then may be the code carried by these receptacles, they are routed to opening stations having no assignment of code and their envelopes collected in a receptacle without a particular destination, where they will be picked up so as to be either put back into the block circuit or distributed by hand.

The possibility of receptacles remaining in a block after passing through the cabinet obviously is only contemplated as an additional safety measure, which may become necessary for instance, in case of breakdown of the extractor mechanisms of one or several cabinet stages.

The reloaded block is lowered automatically from tier to tier through the agency of worms 383 and carrier nuts 384 (or by a device with conveyor belts). They move along descending column 11 of Fig. 1 and are picked up by the horizontal and vertical conveyor chains that bring them to the distributor-collector 3, from where they are directed automatically on to the indexing and distributing cabinets, as set forth at the commencement of the present disclosure.

It is evident that if the number of final classifications is equal to or less than the distributing capacity of the distribution cabinets, it may be possible to leave out the pre-classifying cabinet, whose function is to reassemble the receptacles in blocks for distribution among several classifying and distributing cabinets.

Where the pre-classifying cabinet is omitted, the blocks may be brought directly from the rising conveyor 4 to a horizontal conveyor that will feed the blocks directly to the cabinet or cabinets for final distribution without special appropriation of particular blocks to particular distribution cabinets.

It is quite clear besides that a certain number of mechanisms have not been fully disclosed hereinabove; especially those that serve to ensure the synchronising of the various movements when it is desired to actuate the mechanisms considered through a single motor or a small number of motors.

Such coordinating mechanisms are in fact, standard practice in present technique and their execution does not concern the present invention.

It is also obvious that numerous modifications may be planned for the details of the parts and mechanisms given out without however unduly widening the scope of the invention as defined in accompanying claims and of which the above disclosure is only a non-restrictive example for putting it into practice.

What I claim is:

1. A system for sorting mail and similar articles, comprising indexing stations, separate codable handling receptacles which at said indexing stations are filled with individual articles, coded, and loaded in groups in separate supporting blocks, separate pre-sorting cabinets in which said predeterminedly-coded receptacles are selectively extracted from their respective blocks and regrouped, separate distributing cabinets in which the receptacles are again selectively extracted and then opened and emptied of the articles contained therein, means at each indexing station for individually coding the receptacles as they are filled, and means for decoding each empty receptacle as it approaches the coding means simultaneously with the coding of the previous receptacle.

2. A system for sorting mail and similar articles, comprising indexing stations, separate codable handling receptacles which at said indexing stations are filled with individual articles, coded, and loaded in groups in separate supporting blocks, separate pre-sorting cabinets in which said predeterminedly-coded receptacles are selectively extracted from their respective blocks and regrouped, separate distributing cabinets in which the receptacles are again selectively extracted and then opened and emptied of the articles contained therein, a block-handling frame at each indexing station, means for conveying blocks to a location adjacent said station, a block-receiving stage in said frame, means for transferring blocks from said location to said block-receiving stage, and means for controlling said block transferring means including a device for sensing the presence of a block in said location and another device for sensing the presence or absence of a block in said block-receiving stage.

3. In a sorting system as claimed in claim 2, two lock means, means for retracting one lock means as an empty block is presented from outside in front of the handling frame, means for retracting the other lock means when said frame has no blocks in the block receiving stage, and means operable only when both said locks are retracted to introduce a block into the block-receiving stage of the frame.

4. A system for sorting mail and similar articles, comprising indexing stations, separate codable handling receptacles which at said indexing stations are filled with individual articles, coded, and loaded in groups in separate supporting blocks, separate pre-sorting cabinets in which said predeterminedly-coded receptacles are selectively extracted from their respective blocks and regrouped, separate distributing cabinets in which the receptacles are again selectively extracted and then opened and emptied of the articles contained therein, a block-handling frame at each indexing station, a block-discharging stage in said frame, means for conveying blocks away from a location adjacent said stage, means for transferring blocks from said stage to said location, and means for controlling said block-transferring means including a device for sensing the presence of a block at said location and another device for sensing the presence of a block at said stage.

5. A system for sorting mail and similar articles, comprising indexing stations, separate codable handling receptacles which at said indexing stations are filled with individual articles, coded, and loaded in groups in separate supporting blocks, separate pre-sorting cabinets in which said predeterminedly-coded receptacles are selectively extracted from their respective blocks and regrouped, separate distributing cabinets in which the receptacles are again selectively extracted and then opened and emptied of the articles contained therein, the improvement which comprises a plurality of vertically aligned waiting stations for blocks in one of said cabinets, at least one pivotally supported member associated with two of said stations, said member having a head movable under a block in the upper of said two stations to prevent its downward movement and an arm engageable by a block in the lower of said two stations and effective when so engaged to move said head under said block in the upper station.

6. Sorting apparatus including a plurality of receptacles for carrying individual articles to be sorted, said receptacles having settable indicators for indicating the classification of said articles, an indexing station including conveyor means for carrying receptacles successively through said station, means for inserting one of said articles into each receptacle, means operable to set the indicator on each receptacle in accordance with the classification of the article placed therein, a block for transporting a group of receptacles, means at said indexing station for transferring a group of said receptacles from said conveyor means to said block, a sorting station, means for conveying said block from said indexing station to said sorting station, means at said sorting station for identifying those receptacles in the block which have a predetermined indicator setting, a conveyor for carrying receptacles from said sorting station, and means for transferring said identified receptacles from the block to the conveyor.

7. Mail sorting apparatus including a plurality of receptacles for carrying individual letters to be sorted, said receptacles being relatively wide and thin with narrow end walls and having in said end walls settable indicators for indicating the classification of letters carried therein; an indexing station including a conveyor for carrying receptacles, means for inserting one letter into each said receptacle, coding means engageable with the narrow end wall of each receptacle and operable to set the indicators therein to indicate the destination of said letter, each said receptacle having projecting upper and lower flanges, parallel horizontal conveyor belts for carrying said receptacles through said indexing station, said belts being vertically spaced and having transverse grooves for receiving said flanges to maintain said receptacles vertical, a block for holding a group of receptacles during transportation thereof, said block having upper and lower frame members grooved to receive said flanges, means for transferring said receptacles from the conveyor belts to the block including a stationary guide grooved to receive at least one of the flanges on each block, a sorting station, means for conveying said block from said indexing station to said sorting station, code identifying means at the sorting station and engageable with the end walls of the receptacles in said block and effective to identify and seize those receptacles in the block having a predetermined indicator setting, a receptacle unloading station, a conveyor for carrying receptacles from said sorting station to said unloading station and means including said identifying means for transferring said identified receptacles from the block to said last-mentioned conveyor.

8. Sorting apparatus including a plurality of receptacles for carrying individual articles to be sorted, each said receptacle having a plurality of settable indicators for indicating the classification of said articles, an indexing station including loading means for inserting one of said articles into each receptacle and means operable to move first and second indicators on each receptacle to settings which indicate the classification of the article placed therein in accordance with an established code, a plurality of blocks, each adapted to support a plurality of receptacles during transportation thereof, means at said indexing station for transferring loaded and coded receptacles to said blocks, at least one primary sorting station, means for conveying blocks of loaded receptacles from said indexing station to said primary sorting station, means at said primary sorting station for unloading said blocks and separating said receptacles into a plurality of groups according to the code settings of said first indicators, a plurality of means for reloading said grouped receptacles into said empty blocks, one such reloading means for each group, a plurality of secondary sorting stations equal in number to said plurality of groups, means for conveying blocks of grouped receptacles from each of the reloading means at said primary sorting station to one of the secondary sorting stations, means at each said secondary sorting station for unloading said blocks and separating the receptacles into a plurality of sub-groups according to the code settings of said second indicators, a plurality of means for emptying the articles from said receptacles, one such emptying means for each sub-group, and separate bins for receiving the articles from the respective emptying means.

9. Sorting apparatus including a plurality of carrier blocks, a plurality of receptacles carried by each of said blocks, a plurality of working stations, each said working station comprising block receiving means and means for intermittently removing blocks from said block receiving means; means for transporting said carrier blocks past all said block receiving means; each working station also comprising means for transferring a block from said transporting means to the block receiving means, means for sensing the presence of a block in said block receiving means, means for sensing the presence of a block on said transporting means adjacent said station, and means for controlling said transferring means to cause operation thereof when and only when said block receiving means is unoccupied and a block is present on said transporting means adjacent said station.

10. Conveyor apparatus comprising a plurality of carrier blocks, means for transporting said carrier blocks to a first location, intermittently operating means for transporting said carrier blocks away from a second location adjacent said first location, means for transferring said blocks between said first location and said second location, means for sensing the presence of a block at said first location, means for sensing the presence of a block at said second location, and means including both said sensing means for controlling said transferring means to cause operation thereof when and only when said second location is unoccupied and said first location is occupied.

References Cited in the file of this patent

UNITED STATES PATENTS

| Number | Name | Date |
|---|---|---|
| 919,810 | Barry | Apr. 27, 1909 |
| 1,170,091 | Molyneux | Feb. 1, 1916 |
| 1,237,747 | Cadden | Aug. 21, 1917 |
| 1,479,321 | Runsvold et al. | Jan. 1, 1924 |
| 2,328,386 | McCann | Aug. 31, 1943 |

FOREIGN PATENTS

| Number | Country | Date |
|---|---|---|
| 473,996 | Great Britain | Oct. 25, 1937 |